(12) United States Patent
Murata et al.

(10) Patent No.: US 10,739,501 B2
(45) Date of Patent: Aug. 11, 2020

(54) LIGHT DIFFUSION FILM LAMINATE FOR REFLECTIVE DISPLAY DEVICE AND REFLECTIVE DISPLAY DEVICE INCLUDING THE SAME

(71) Applicant: TOMOEGAWA CO., LTD., Tokyo (JP)

(72) Inventors: Makoto Murata, Shizuoka (JP); Hiroto Katagiri, Shizuoka (JP)

(73) Assignee: TOMOEGAWA CO., LTD., Tokyo (JP)

( * ) Notice: Subject to any disclaimer, the term of this patent is extended or adjusted under 35 U.S.C. 154(b) by 0 days.

(21) Appl. No.: 16/332,035

(22) PCT Filed: Aug. 14, 2017

(86) PCT No.: PCT/JP2017/029246
§ 371 (c)(1),
(2) Date: Mar. 11, 2019

(87) PCT Pub. No.: WO2018/051700
PCT Pub. Date: Mar. 22, 2018

(65) Prior Publication Data
US 2019/0302327 A1    Oct. 3, 2019

(30) Foreign Application Priority Data
Sep. 14, 2016  (JP) .................................. 2016-179794

(51) Int. Cl.
*G02B 5/02* (2006.01)
*F21V 8/00* (2006.01)
(Continued)

(52) U.S. Cl.
CPC .............. *G02B 5/0236* (2013.01); *B32B 7/02* (2013.01); *G02B 5/02* (2013.01); *G02B 6/0051* (2013.01);
(Continued)

(58) Field of Classification Search
None
See application file for complete search history.

(56) References Cited

U.S. PATENT DOCUMENTS

2006/0204744 A1* 9/2006 Hiraishi ............... G02B 5/0231
428/327
2010/0195313 A1* 8/2010 Hiraishi ............... G02B 5/0278
362/97.1
(Continued)

FOREIGN PATENT DOCUMENTS

JP       2009-150971 A    7/2009
JP       4317006 B2       8/2009
(Continued)

OTHER PUBLICATIONS

Translation of International Preliminary Report on Patentability for PCT/JP2017/029246 dated Mar. 28, 2019.

*Primary Examiner* — Ryan Crockett
(74) *Attorney, Agent, or Firm* — Muncy, Geissler, Olds & Lowe, P.C.

(57) ABSTRACT

Provided is a light diffusion film laminate for a reflective display device which is capable of reducing the change in the brightness of the image without reducing the visibility not only from a predetermined observation position (for example, the front direction of the screen), but also from a slightly inclined direction from the predetermined observation position (for example, the front direction of the screen), thereby having excellent display characteristics, and a reflective display device including the light diffusion film laminate.

12 Claims, 12 Drawing Sheets

(51) Int. Cl.
   *G02F 1/1335*      (2006.01)
   *B32B 7/02*        (2019.01)
(52) U.S. Cl.
   CPC ...... *G02F 1/1335* (2013.01); *G02F 1/133504* (2013.01); *G02F 1/133553* (2013.01); *G02F 2202/023* (2013.01)

(56) References Cited

U.S. PATENT DOCUMENTS

| | | | |
|---|---|---|---|
| 2014/0204296 A1 | 7/2014 | Mitsui et al. | |
| 2015/0338698 A1* | 11/2015 | Sugiyama | G02F 1/133504 349/112 |
| 2016/0018571 A1* | 1/2016 | Kusama | G02B 5/0236 428/220 |
| 2016/0033692 A1* | 2/2016 | Kusama | G02B 5/0236 359/599 |
| 2016/0047952 A1* | 2/2016 | Kusama | G02B 5/0236 252/582 |
| 2016/0077246 A1* | 3/2016 | Kusama | G02B 1/04 359/599 |
| 2016/0116646 A1* | 4/2016 | Araki | G02B 6/0051 349/112 |
| 2016/0223725 A1* | 8/2016 | Lim | B29D 11/00798 |
| 2016/0327697 A1* | 11/2016 | Sugiyama | G02B 5/0236 |
| 2016/0363807 A1 | 12/2016 | Mitsui et al. | |
| 2017/0192137 A1* | 7/2017 | Sakano | B05D 7/04 |
| 2017/0293054 A1* | 10/2017 | Kusama | G02B 5/0236 |
| 2018/0164475 A1* | 6/2018 | Meyer | G02B 5/0231 |
| 2019/0204488 A1* | 7/2019 | Sakano | G02F 1/1335 |

FOREIGN PATENT DOCUMENTS

| | | |
|---|---|---|
| JP | 2010-044319 A | 2/2010 |
| JP | 2012-141591 A | 7/2012 |
| JP | 2014-142502 A | 8/2014 |
| WO | 2002/097483 A1 | 12/2002 |

\* cited by examiner (a)

(b)

(c)

(d)

(e)

LIGHT DIFFUSION FILM LAMINATE FOR REFLECTIVE DISPLAY DEVICE AND REFLECTIVE DISPLAY DEVICE INCLUDING THE SAME

TECHNICAL FIELD

The present invention relates to a light diffusion film laminate for a reflective display device and a reflective display device including the light diffusion film laminate.

BACKGROUND ART

In recent years, a display device that performs reflective display (hereinafter referred to as "reflective display device") is used for an electronic book reader and the like. Here, the reflective display is a display method in which an external light is reflected to display an image, and examples thereof include a display method using a cholesteric liquid crystal, a display method using an electrowetting, an electrophoretic display system of microcapsules, and a display system of an electronic liquid powder.

Compared with a transmissive liquid crystal display device having a backlight and a self-luminous display device such as an EL (Electro Luminescence) display, the reflective display device has the feature of having low power consumption because it does not have a backlight. Also, while clear images can be visually recognized under strong external light such as sunlight, there is a characteristic that it is hard to obtain sufficient brightness under a limited external light such as indoors, and visibility deteriorates.

In the reflective display device, it is common to provide a diffusion layer (diffusion film) on the display screen, for example, in order to reduce the metallic luster of the reflective member that reflects external light.

Further, there is known a reflective display device aiming at obtaining sufficient brightness by diffusing reflected light which is light reflected from external light in a limited direction by using an anisotropic scattering layer (For example, Patent Literature 1).

When a user (observer) using the reflective display device views the screen with a reflective display device, for example, a tablet terminal or the like, the user (observer) views the tablet terminal in a manner that the user (observer) and the tablet terminal or the like face each other according to the user (observer) posture. In this case, it is desirable to make the brightness in the front direction of the screen sufficient. Therefore, in the prior art, by using an anisotropic scattering layer for the reflective display device, light in the regular reflection direction is widely diffused to increase the brightness in the front direction of the screen.

CITATION LIST

Patent Literature

Patent Literature 1: JP 2014-142502 A

SUMMARY OF INVENTION

Technical Problem

However, the user (observer) does not always and strictly faces the tablet terminal and the like, but from time to time the posture of the user (observer) changes to view the screen from a slightly inclined direction.

That is, it is desirable to diffuse light such that the degree of brightness at a direction slightly inclined from a predetermined observation position (for example, inclination of about 10°) is the same as that at the predetermined observation position (for example, the front direction). However, in the diffusion layer (diffusion film) and the anisotropic scattering layer used in the conventional reflective display device, since the brightness at the predetermined observation position is particularly high, due to changing the posture of the user (observer) and the like, the observation position changes in a direction slightly inclined from a predetermined observation position, so that there is a problem that the user feels a decrease in brightness (the screen becomes dark).

The present invention has been made in view of the above circumstances, and an object of the present invention is to provide a light diffusion film laminate for a reflective display device which is capable of reducing the change in the brightness of the image without reducing the visibility not only from a predetermined observation position (for example, the front direction of the screen), but also from a slightly inclined direction from the predetermined observation position (for example, the front direction of the screen), thereby having excellent display characteristics and being excellent in display quality, and a reflective display device including the light diffusion film laminate.

Solution to Problem

In order to solve the above-mentioned problems, a light diffusion film laminate for a reflective display device of the present invention has optical diffusibility that changes depending on an incident angle of light, and at least transmitting reflected light occurring when incident light is reflected by a reflective layer. The light diffusion film laminate includes at least an anisotropic light diffusion layer whose linear transmittance varies depending on the incident angle of the light; and an isotropic light diffusion layer provided on one surface of the anisotropic light diffusion layer, wherein the anisotropic light diffusion layer has a matrix region, and a pillar region composed of a plurality of pillar structures in the anisotropic light diffusion layer, wherein a scattering central axis angle of the anisotropic light diffusion layer is −5° or more and +5° or less with respect to a normal direction of the anisotropic light diffusion layer, and wherein the light diffusion film laminate for the reflective display device includes the anisotropic light diffusion layer and the isotropic light diffusion layer in this order from a reflected light viewing side.

Advantageous Effect of Invention

According to the present invention, it is possible to provide a light diffusion film laminate for a reflective display device which is capable of reducing the change in the brightness of the image without reducing the visibility not only from a predetermined observation position (for example, the front direction of the screen), but also from a slightly inclined direction from the predetermined observation position (for example, the front direction of the screen), thereby having excellent display characteristics.

MODE FOR CARRYING OUT THE INVENTION

Figure 1:
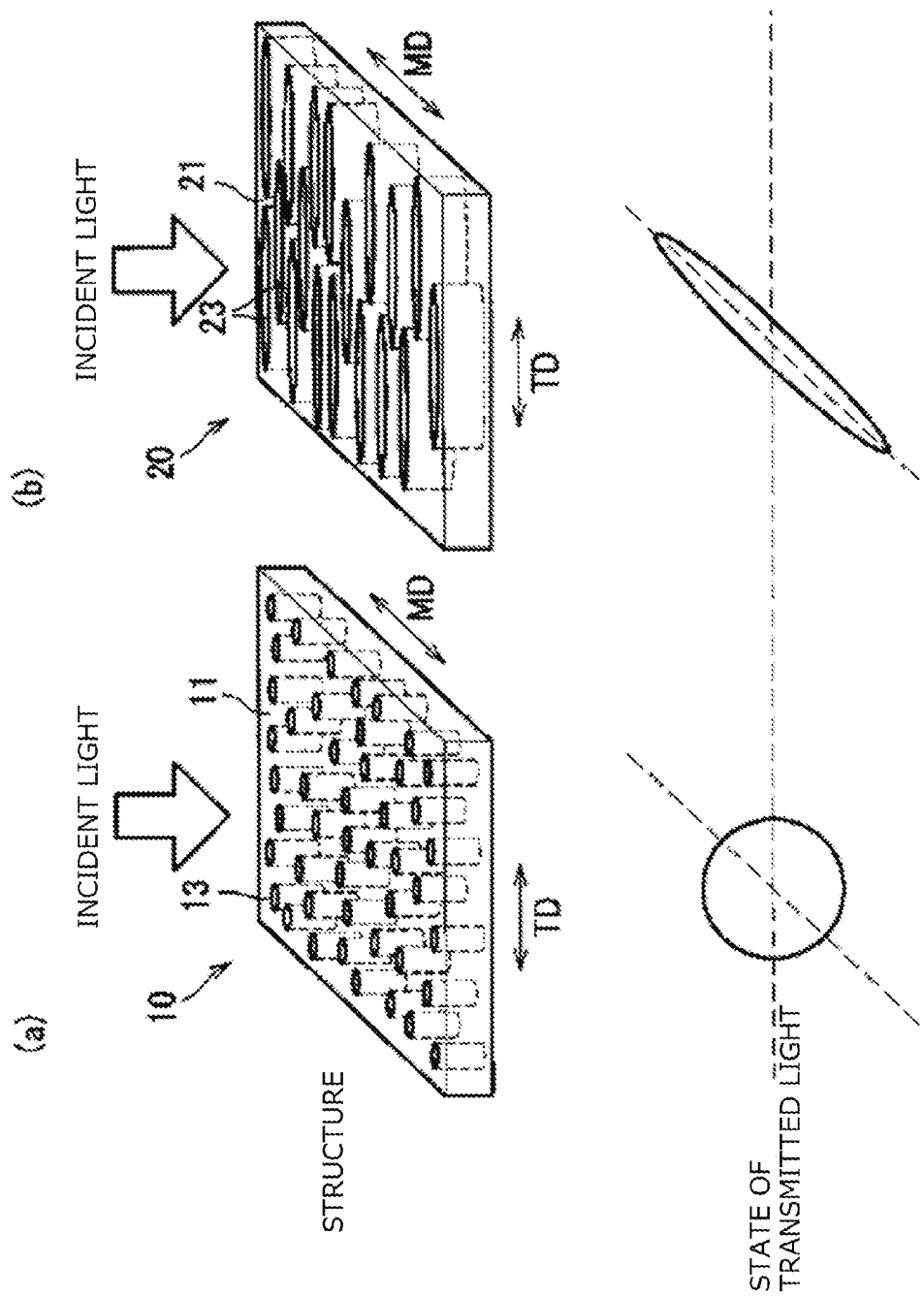
FIG. 1 is schematic diagram showing an example of the structures of anisotropic optical films (anisotropic light diffusion layer) having a plurality of pillar structures (pillar region) of a columnar structure and a tabular structure according to this embodiment and the state of transmitted light incident into these anisotropic optical films.

Hereinafter, embodiments will be described in detail in the following order with reference to the drawings.
0. Definition of Major Terms
1. Structure and Characteristics of Anisotropic Optical Film
 1-1. Basic Structure of Anisotropic Optical Film
 1-2. Characteristics of Anisotropic Optical Film
2. Configuration of Anisotropic Optical Film
 2-1. Overall configuration
 2-2. Anisotropic Light Diffusion Layer 120
  2-2-1. Pillar Structure 123
  2-2-2. Aspect Ratio of Pillar Structure 123
  2-2-3. Average Short diameter and Average Long diameter of Pillar Structure 123
  2-2-4. Thickness of Region Where Pillar Structure 123 is Formed
 2-3. Properties of Anisotropic Optical Film 100
  2-3-1. Linear Transmittance
  2-3-2. Diffusion Width
  2-3-3. Scattering Central Axis
  2-3-4. Refractive Index
  2-3-5. Haze Value
3. Isotropic Light Diffusion Layer 200
 3-1. Resin Base Material
 3-2. Fine Particles and Other Components
 3-3. Refractive Index
 3-4. Average Particle Diameter
 3-5. Content
 3-6. Haze Value
 3-7. Total Light Transmittance
4. Arrangement Configuration of Anisotropic Optical Film 100 and Isotropic Light Diffusion Layer 200 (Light Diffusion Film Laminate 30)
5. Example 0. Definition of Major Terms Here, main terms of the anisotropic optical film (anisotropic light diffusion layer) are defined.

The term anisotropic optical film includes a film of a single anisotropic light diffusion layer (only one layer), or a film in which two or more anisotropic light diffusion layers are laminated (in this case, an adhesive layer may be laminated between the anisotropic light diffusion layers), and others. Therefore, for example, when the anisotropic light diffusion layer is a single layer, the anisotropic light diffusion layer of the single layer is an anisotropic optical film.

The anisotropic optical film has anisotropy and directivity to have dependency on incident light angle in which the light diffusion, transmission, and diffusion distribution change depending on the incident angle of light (details will be described later). Therefore, it is different from the directivity diffusion film which does not depend on incident light angle, the isotropic diffusion film, and the diffusion film oriented in a specific direction.

The low refractive index region and the high refractive index region are regions formed by the high/low difference in the local refractive index of the material constituting the anisotropic optical film according to the present invention, and are relative, indicating whether one region has the low or high refractive index, compared with the other. These regions are formed when the material of the anisotropic optical film cures.

The scattering central axis means a direction in which the light diffusibility coincides with the incident light angle at which light diffusibility has a substantially symmetric property when changing the incident light angle to the anisotropic optical film. Use of "substantial" for the symmetric property means that the optical profile (described later) with respect to light diffusibility is not symmetrical in strict meaning when the scattering central axis has an inclination with respect to the normal direction of the film (film thickness direction of the film). The scattering central axis can be seen by observing the slope of the cross section of the anisotropic optical film with an optical microscope or observing the projection shape of the light via the anisotropic optical film by changing the incident light angle.

In addition, the linear transmittance generally refers to linear transmitting property of light incident into an anisotropic optical film, and the ratio of the transmitted light quantity in the linear direction to the light quantity of the incident light when light enters the film at a certain incident light angle, and is expressed by the following expression.

Linear transmittance (%)=(linear transmitted light quantity/incident light quantity)×100

Further, in the present invention, both the scattering and the diffusion are used without distinction, and both have the same meaning. Furthermore, the meaning of the photopolymerization and the photocuring is that the photopolymerizable compound undergoes polymerization reaction by light, and both are used synonymously.

Hereinafter, preferred embodiments of the present invention will be described in detail with reference to the drawings. In this specification and the drawings, constituent elements given the same reference numerals have substantially the same structure or function.

1. Structure and Characteristics of Anisotropic Optical Film

With reference to FIGS. 1 to 4, as a premise to describe the anisotropic optical film according to the present embodiment, the structure and the characteristics of a anisotropic optical film of a single layer (an anisotropic optical film of a single anisotropic light diffusion layer in the present embodiment) according to the prior art will be described.

Figure 2:
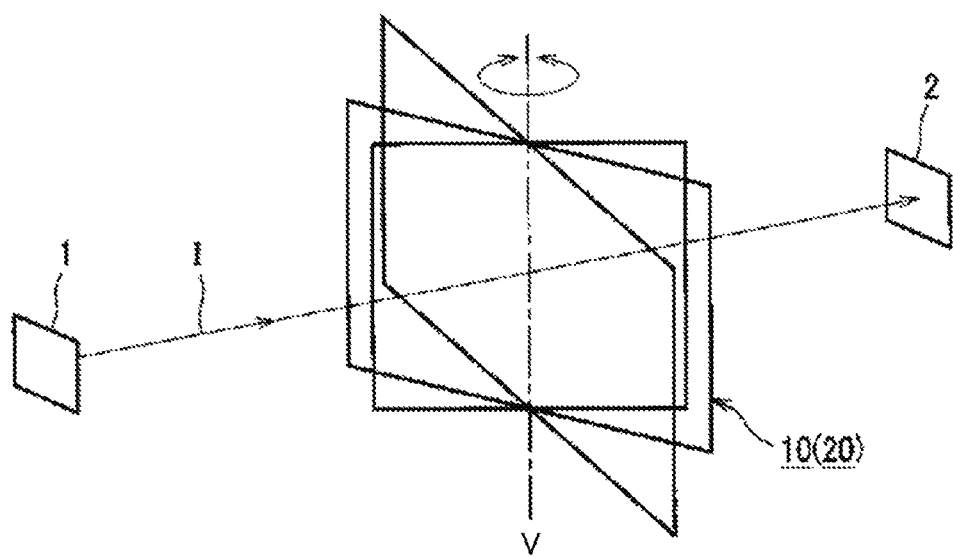
FIG. 2 is an explanatory diagram showing a method of evaluating the light diffusibility of the anisotropic optical film (anisotropic light diffusion layer) according to this embodiment.
Figure 3:
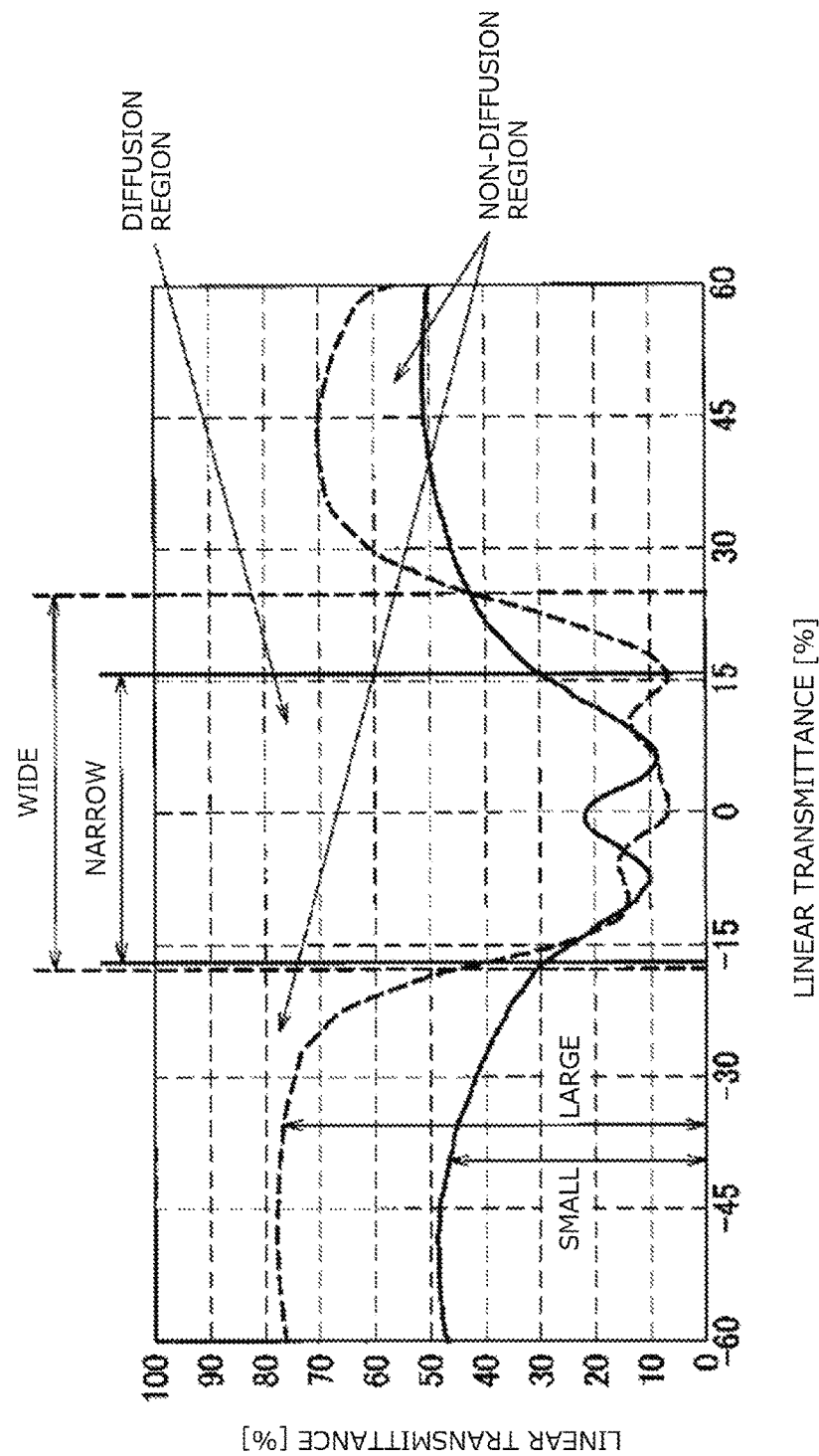
FIG. 3 is a graph showing a relationship between an incident light angle and a linear transmittance to an anisotropic optical film (anisotropic light diffusion layer) having a columnar structure and a tabular structure shown in FIG. 1 according to the present embodiment.
Figure 4:
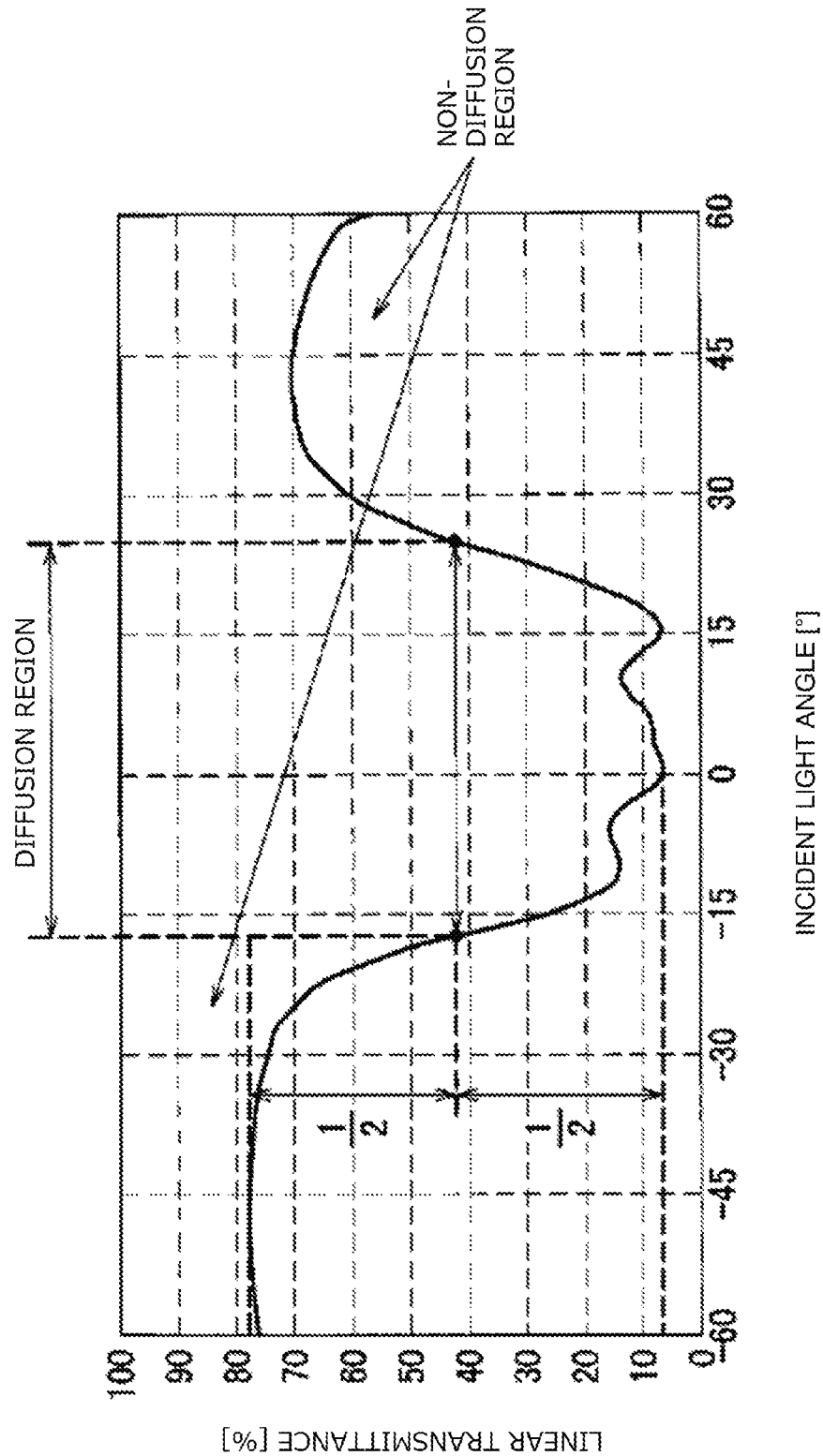
FIG. 4 is a graph for explaining a diffusion region and a non-diffusion region according to the present embodiment.

FIG. 1 is schematic diagram showing an example of the structures of an anisotropic optical film (anisotropic light diffusion layer) of a single layer having a plurality of pillar structures (pillar regions) of a columnar structure and a tabular structure and the state of transmitted light incident into the anisotropic optical film (anisotropic light diffusion layer). FIG. 2 is an explanatory diagram showing a method of evaluating the light diffusibility of the anisotropic optical film. FIG. 3 is a graph showing a relationship between an incident light angle and a linear transmittance to an anisotropic optical film (anisotropic light diffusion layer) having a columnar structure and a tabular structure shown in FIG. 1. FIG. 4 is a graph for explaining a diffusion region and a non-diffusion region.

1-1. Basic Structure of Anisotropic Optical Film

A region having a refractive index different from that of the matrix region of the film is formed in the film thickness direction (normal direction) in the anisotropic optical film. The shape of the regions having different refractive indexes is not particularly limited. The shape includes, for example, as shown in FIG. 1(a), an anisotropic optical film 10 (anisotropic optical film having a columnar structure) in which a plurality of pillar structures 13 (pillar regions) with different refractive indexes formed in a pillar shape (for example, a bar shape) having a small aspect ratio consisting of a long diameter and a short diameter are formed in a matrix region 11, as shown in FIG. 1(b), an anisotropic optical film 20 (an anisotropic optical film having a tabular structure) in which a plurality of pillar structures 23 (pillar regions) having different refractive indexes formed in a pillar shape (for example, substantially plate-like) having a large aspect ratio are formed in a matrix region 21, and the like.

1-2. Characteristics of Anisotropic Optical Film

The anisotropic optical film having the above structure is a light diffusion film having different light diffusibility depending on the incident light angle to the film, that is, a light diffusion film having dependency on incident light angle. When light incident into the anisotropic optical film at a predetermined incident light angle is substantially parallel to the orientation direction of the regions with different refractive indexes (for example, the direction (orientation direction) in which the plurality of pillar structures 13 in the columnar structure extend, and the height direction (film thickness direction or normal direction of the anisotropic optical film) of the plurality of columnar structures 23 in the tabular structure)), priority is given to diffusion, and when it is not parallel to the orientation direction, priority is given to transmission.

Here, with reference to FIGS. 2 and 3, the light diffusibility of the anisotropic optical film will be described more specifically. Here, explanation will be given by exemplifying the light diffusibility of the anisotropic optical film 10 having the columnar structure and the anisotropic optical film 20 having the tabular structure.

The light diffusibility evaluation is performed as follows. First, as shown in FIG. 2, the anisotropic optical film 10, 20 is arranged between a light source 1 and a detector 2. In the present embodiment, the incident light angle at which irradiation light I from the light source 1 enters from the normal direction of the plane of the anisotropic optical film 10, 20 is set as 0°. In addition, the anisotropic optical film 10, 20 is disposed so as to be rotatable at any angle around a straight line V, and the light source 1 and the detector 2 are fixed. That is, according to this method, a sample (anisotropic optical film 10, 20) is placed between the light source 1 and the detector 2, and it is possible to measure the linear transmittance that passes straight through the sample and enters the detector 2 while the angle is changed around the straight line V on the sample surface as the central axis.

The light diffusibility of the anisotropic optical film 10, 20 is evaluated when the TD direction (axis in the width direction of the anisotropic optical film) of FIG. 1 is selected as the straight line V of the rotation center shown in FIG. 2, and the evaluation result of the obtained light diffusibility is shown in FIG. 3. FIG. 3 shows the dependency on incident light angle of the light diffusibility (light scattering characteristic) of the anisotropic optical film 10, 20 shown in FIG. 1 measured by the method shown in FIG. 2. The vertical axis in FIG. 3 represents the linear transmittance, which is an index indicating the degree of scattering, (in the present embodiment, the ratio of the light quantity of parallel rays emitted in the same direction as the incident direction to a predetermined light quantity of the parallel rays which are incident, more specifically, the linear transmittance=(the quantity of light detected by the detector 2 when the anisotropic optical film 10, 20 is present (transmitted light quantity in the linear direction of the incident light)/the quantity of light detected by the detector 2 when the anisotropic optical film 10, 20 is not present (the light quantity of the incident light))×100, where the horizontal axis shows the incident light angle to the anisotropic optical film 10, 20. The solid line in FIG. 3 shows the light diffusibility of the anisotropic optical film 10 of the columnar structure, and the broken line shows the light diffusibility of the anisotropic optical film 20 of the tabular structure. The positive and negative of the incident light angle indicates that the anisotropic optical film 10, 20 is rotated in the opposite directions.

As shown in FIG. 3, the anisotropic optical film 10, 20 has dependency on incident light angle of light diffusibility in which the linear transmittance changes depending on the incident light angle. Here, the curved line showing dependency on incident light angle of the light diffusibility as shown in FIG. 3 is hereinafter referred to as an optical profile. The optical profile does not directly express the light diffusibility. However, the decrease in the linear transmittance may increase the diffuse transmittance, so that it can be said that the optical profile generally indicates the light diffusibility. In other words, as the linear transmittance decreases, the diffuse transmittance of the incident light increases. Specifically, in the anisotropic optical film 10, 20, assuming that the incident light angle in the direction of the scattering central axis of the pillar region 13, 23 is 0°, the linear transmittance shows a valley type optical profile in which the linear transmittance is relatively lowered, and has a minimum value at an incident light angle of −20° to +20°, and the linear transmittance increases as (the absolute value of) the incident light angle increases, and has a maximum value at an incident light angle of −60° to −30° or +30° to +60°. As described above, the anisotropic optical film 10, 20 has properties in which incident light is strongly diffused in the incident light angle range of −20° to +20° close to the scattering central axis direction, but the diffusion is weakened and the linear transmittance is increased in the range of the incident light angle in which the absolute value of the incident light angle is larger than the above range is.

Here, as shown in FIG. 3, properties (optical profile), in which light diffusion is given priority in a certain angle range, and in which light transmission is given priority in another angle range, are referred to as anisotropy. That is, the diffusion and the transmission of light change depending on the incident light angle of light.

Also, the properties in which the light diffusion distribution differs depending on the diffusion angle is referred to as directivity. In the present invention, the diffusion distribution of light not only differs depending on diffusion angle, but also has further dependency on incident light angle in which the diffuse distribution changes depending on the incident light angle of light. That is, the diffuse distribution of light represent anisotropy and directivity to have dependency on incident light angle in which the light diffusion, transmission and diffusion distribution change depending on the incident angle of light.

In the following, the angle range between the two incident light angles with respect to the linear transmittance of the intermediate value between the maximum linear transmittance and the minimum linear transmittance is referred to as a diffusion region (the width of this diffusion region is referred to as diffusion width), and the incident light angle range other than the diffusion region is referred to as a non-diffusion region (transmission region).

Here, with reference to FIG. 4, the diffusion region and the non-diffusion region will be described by taking the anisotropic optical film 20 of the tabular structure as an example. FIG. 4 shows the optical profile of the anisotropic optical film 20 having the tabular structure shown in FIG. 3. As shown in FIG. 4, the incident light angle range between two incident light angles (inside the two incident light angles at the positions of the two black dots on the optical profile shown in FIG. 4) with respect to the linear transmittance of the intermediate value (in the example of FIG. 4, the linear transmittance is about 42%) between the maximum linear transmittance (in the example of FIG. 4, the linear transmittance is about 78%) and the minimum linear transmittance (in the example of FIG. 4, the linear transmittance is about 6%) corresponds to the diffusion region (diffusion of light is given priority), and the incident light angle range other than the above (outside the two incident light angles at the positions of the two black dots on the optical profile shown in FIG. 4) corresponds to a non-diffusion region (priority is given to light transmission).

In the anisotropic optical film 10 having a columnar structure, as can be seen from the state of transmitted light in FIG. 1(*a*), the transmitted light has a substantially circular shape, and substantially the same light diffusibility in the MD direction and the TD direction. That is, for the anisotropic optical film 10 having a columnar structure, the diffusion has azimuthally isotropy. Further, as shown by the solid line in FIG. 3, even if the incident light angle is changed, since the change in the light diffusibility (in particular, the optical profile in the vicinity of the boundary between the non-diffusion region and the diffusion region) is relatively gentle, there is an effect in which discomfort due to an abrupt change in brightness does not occur. However, as can be understood from comparison with the optical profile of the anisotropic optical film 20 having the tabular structure shown by the broken line in FIG. 3, since the linear transmittance in the non-diffusion region is low in the anisotropic optical film 10, there is a problem that display characteristics (luminance, contrast, etc.) are slightly lowered. In addition, the anisotropic optical film 10 of the columnar structure also has a problem that the width of the diffusion region is narrow, compared with the anisotropic optical film 20 of the tabular structure. Note that the columnar structure has no directivity of diffusion by the azimuth angle, but it has directivity with respect to the distribution of diffusion.

On the other hand, for the anisotropic optical film 20 having the tabular structure, as can be seen from the state of the transmitted light in FIG. 1(*b*), the transmitted light has a substantially needle-like shape, and the light diffusibility in the MD direction is greatly different from that in the TD direction. That is, for the anisotropic optical film 20 having the tabular structure, the diffusion has directivity in which the diffusion characteristics are greatly different depending on the azimuth angle. Specifically, in the example shown in FIG. 1(*b*), while the diffusion in the tabular structure is wider than that in the columnar structure in the MD direction, the diffusion in the tabular structure is narrower than that in the columnar structure in the TD direction. Further, as indicated by a broken line in FIG. 3, when the incident light angle is changed, since the change in the light diffusibility (in particular, the optical profile in the vicinity of the boundary between the non-diffusion region and the diffusion region) is extremely steep (in the TD direction in the present embodiment), when the anisotropic optical film 20 is applied to a display device, an abrupt change in brightness appears, which may cause discomfort. In addition, the anisotropic optical film of the tabular structure has a problem that light interference (rainbow) is likely to occur. However, for the anisotropic optical film 20, there is an effect that the linear transmittance in the non-diffusion region is high and the display characteristics can be improved. In particular, the direction of diffusion (MD direction in FIG. 1(*b*)) to which priority is given is made to coincide with the direction in which it is desired to widen the viewing angle, so that it is possible to widen the viewing angle in the intended specific direction.

2. Configuration of Anisotropic Optical Film

Figure 5:
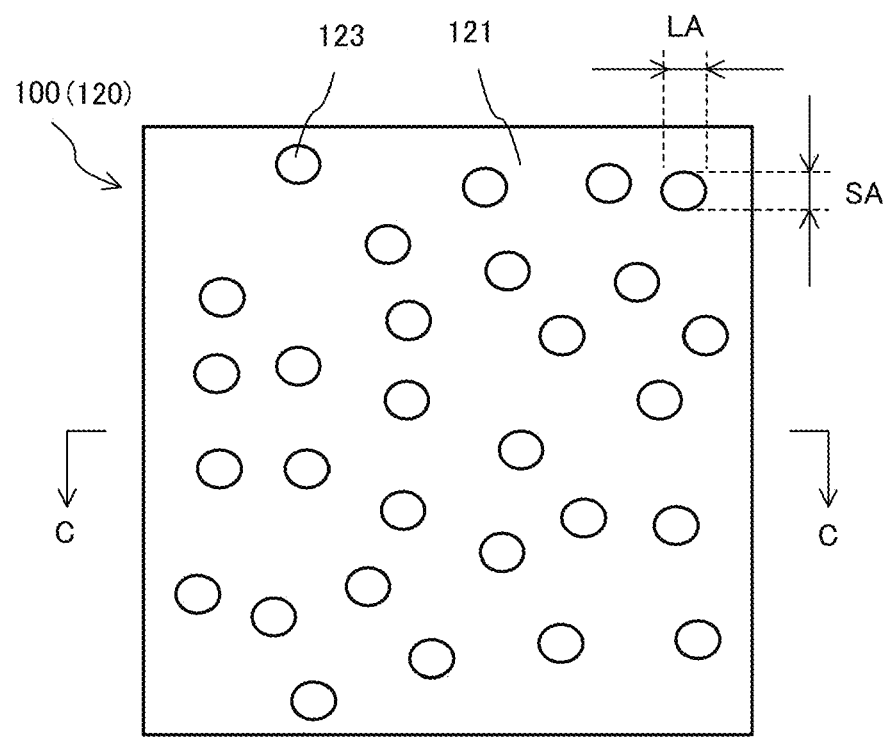
FIG. 5 shows a schematic diagram of the configuration example of anisotropic light diffusion layers in the anisotropic optical film according to this embodiment.

The configuration of an anisotropic optical film 100 according to this embodiment will be described with reference to FIG. 5. FIG. 5 shows an example of the configuration of an anisotropic light diffusion layer 120 in the anisotropic optical film 100 according to this embodiment. In the following description, the anisotropic optical film 100 may be simply referred to as the anisotropic light diffusion layer 120.

2-1. Overall Configuration

As shown in FIG. 5, the anisotropic optical film 100 is an anisotropic optical film having the anisotropic light diffusion layer 120 whose linear transmittance changes depending on the incident light angle.

Hereinafter, the anisotropic optical film 100 having the anisotropic light diffusion layer 120 will be described in detail.

2-2. Anisotropic Light Diffusion Layer 120

The anisotropic light diffusion layer 120 has a columnar structure (the configuration same as that of the anisotropic optical film 10 in FIG. 1(a)), has light diffusibility in which the linear transmittance changes depending on the incident light angle. As shown in FIG. 5, the anisotropic light diffusion layer 120 is made of a cured product of a composition containing a photopolymerizable compound, and includes the matrix region 121 and a plurality of pillar structures 123 (pillar region) having a refractive index different from that of the matrix region 121. The plurality of pillar structures 123 and the matrix region 121 have irregular distributions and shapes, but they are formed over the entire surface of the anisotropic light diffusion layer 120, so that obtained optical characteristics (for example, linear transmittance, etc.) are substantially the same. Since the plurality of pillar structures 123 and the matrix region 121 have irregular distributions and shapes, the anisotropic light diffusion layer 120 according to this embodiment is not likely to generate light interference (rainbow). The orientation direction P (extending direction) of the pillar structure 123 is formed so as to be parallel to the scattering central axis, and is determined as appropriate so that the anisotropic light diffusion layer 120 has a desired linear transmittance and diffusibility. It should be noted that the orientation directions of the scattering central axis and the pillar region can be parallel to each other as long as they satisfy the law of refractive index (Snell's law), and need not be strictly parallel. According to Snell's law, when light is incident on the interface of the medium having the refractive index $n_2$ from the medium having the refractive index $n_1$, the relation of $n_1 \sin \theta_1 = n_2 \sin \theta_2$ holds between the incident light angle $\theta_1$ and the refraction angle $\theta_2$. For example, assuming that $n_1=1$ (air) and $n_2=1.51$ (anisotropic optical film), the orientation direction (refraction angle) of the pillar region is about 19° when the incident light angle is 30°. Even if the incident light angle and the refraction angle are different from each other, the concept of parallel is applied in the present embodiment as long as they satisfy the Snell's law.

The anisotropic light diffusion layer 120 in this embodiment is such that the orientation direction of the pillar structure 123 substantially matches the film thickness direction (normal direction) of the film. In this case, "substantially match" means that the pillar structure 123 extends in the direction from −5° or more and +5° or less with respect to the normal direction. In this case, the anisotropic light diffusion layer 120 has properties in which the incident light is strongly diffused in an incident light angle range (diffusion region) close to the normal direction, and the diffusion is weakened and the linear transmittance is increased in an incident light angle range (non-diffusion region) beyond the above range.

2-2-1. Pillar Structure 123

The pillar structure 123 according to this embodiment is provided as a plurality of pillar structures in the matrix region 121 and each pillar structure 123 is formed so that the orientation direction is parallel to the scattering central axis. Therefore, the plurality of pillar structures 123 in the same anisotropic light diffusion layer 120 are formed so as to be parallel to each other.

The refractive index of the matrix region 121 may be different from the refractive index of the pillar region, but how much the refractive index differs is not particularly limited and is relative. When the refractive index of the matrix region 121 is lower than the refractive index of the pillar region, the matrix region 121 is a low refractive index region. Conversely, when the refractive index of the matrix region 121 is higher than the refractive index of the pillar region, the matrix region 121 is a high refractive index region.

As shown in FIG. 5, a cross-sectional shape perpendicular to the orientation direction of the pillar structure 123 has the short diameter SA and the long diameter LA. It is preferable that the cross-sectional shape of the pillar structure 123 satisfies the range of the aspect ratio (less than 2) described below. For example, in FIG. 5, the cross-sectional shape of the pillar structure 123 is shown as a circle. The cross-sectional shape of the pillar structure 123 is not limited to a circular shape but may be an elliptic shape, a polygonal shape, an indefinite shape, a combination thereof, and others.

2-2-2. Aspect Ratio of Pillar Structure 123

The plurality of pillar structures 123 have preferably the aspect ratio (=average long diameter/average short diameter) of the average value of short diameter SA (average short diameter) and the average value of long diameter LA (average long diameter) of less than 2, more preferably the aspect ratio of less than 1.5, and still more preferably the aspect ratio of less than 1.2.

The anisotropic optical film 100 according to this embodiment has various characteristics at a higher level in a well-balanced manner by setting the aspect ratio of the average long diameter to the average short diameter of the plurality of pillar structures 123 to the above preferable ranges.

2-2-3. Average Short Diameter and Average Long Diameter of Pillar Structure 123

Further, the average value (average short diameter) of the short diameters SA of the plurality of pillar structures 123 is preferably 0.5 μm or more, more preferably 1.0 μm or more, and still more preferably 1.5 μm or more. On the other hand, it is preferable that the average value (average short diameter) of the short diameters SA of the plurality of pillar structures 123 is 5.0 μm or less, more preferably 4.0 μm or less, and still more preferably 3.0 μm or less. The lower limit value and the upper limit value of the average short diameter of the plurality of pillar structures 123 can be appropriately combined.

Further, the average value (average long diameter) of the long diameters LA of the plurality of pillar structures 123 is preferably 0.5 μm or more, more preferably 1.0 μm or more, and still more preferably 1.5 μm or more. On the other hand, the average value (average long diameter) of the long diameters LA of the plurality of pillar structures 123 is preferably 8.0 μm or less, more preferably 5.0 μm or less, and still more preferably 3.0 μm or less. The lower limit value and the upper limit value of the average long diameter of the plurality of pillar structures 123 can be appropriately combined.

The anisotropic optical film 100 according to the present embodiment has various characteristics at a higher level in a well-balanced manner by setting both the average short diameter and the average long diameter of the plurality of pillar structures 123 to the above preferable ranges.

Note that the average value (average short diameter) of the short diameters SA and the average value (average long diameter) of the long diameters LA of the plurality of pillar structures 123 in this embodiment may be obtained by observing the surface of the anisotropic light diffusion layer 120 with a microscope, measuring the short diameters SA and the long diameters LA of the appropriately selected 100 pillar structures 123, and calculating the average value of them. A value obtained by dividing the average value (average long diameter) of the long diameters LA obtained above by the average value (average short diameter) of the short diameters SA is used as the aspect ratio of the pillar structure.

2-2-4. Thickness of Region Where Pillar Structure 123 is Formed

The thickness T of the plurality of pillar structure 123 is preferably from 10 μm to 200 μm, more preferably 20 μm or more and less than 100 μm, and still more preferably 20 μm or more and less than 50 μm. When the thickness T exceeds 200 μm, not only the material cost is increased but also the cost for UV irradiation is increased, so that not only the cost is increased but also image blurring and contrast reduction due to an increase in diffusibility in the thickness T direction is likely to occur. In addition, when the thickness T is less than 10 μm, it may be difficult to provide sufficient diffusibility and condensation of light. According to the present invention, by setting the thickness T within the specified range, it is possible to reduce the cost problem, and to achieve excellent diffusibility and condensation of light, and image blurring is not likely to occur, and the contrast can be improved due to reduction in the light diffusibility in the thickness T direction.

2-3. Properties of Anisotropic Optical Film 100

As described above, the anisotropic optical film 100 has the anisotropic light diffusion layer 120. More specifically, the anisotropic light diffusion layer 120 has a columnar structure (preferably a region having a pillar region with an aspect ratio of less than 2). The properties of such an anisotropic optical film 100 will be described below.

2-3-1. Linear Transmittance

Here, assuming the linear transmittance of light incident into the anisotropic optical film 100 (the anisotropic light diffusion layer 120) at the incident light angle at which the linear transmittance is maximized is defined as the maximum linear transmittance, the anisotropic optical film 100 (the anisotropic light diffusion layer 120) has a maximum linear transmittance of 15% or more and less than 90%, preferably 20% or more and less than 90%, more preferably 30% or more and less than 90%, still more preferably 50% or more and less than 90%, and particularly preferably 70% or more and less than 90%.

Note that the linear transmittance of light incident into the anisotropic light diffusion layer 120 at the incident light angle at which the linear transmittance is minimized can be defined as the minimum linear transmittance. The minimum linear transmittance is preferably 10% or less.

By setting the maximum linear transmittance of the anisotropic optical film 100 in the above range, it is possible to obtain an appropriate anisotropy, so that the applicable range of the anisotropic optical film 100 can be widened. For example, when the anisotropic optical film 100 is used for a display device, if the anisotropy is too strong, there is a problem that the diffusion and condensation of light in the TD direction tends to be inadequate although the diffusion and condensation of light in the MD direction is extremely excellent. The anisotropic optical film 100 according to this embodiment has the maximum linear transmittance described above, so that it maintains excellent diffusion and condensation of light in the MD direction, and furthermore provides sufficient diffusion and condensation of light in the TD direction.

Here, the linear transmitted light quantity and the linear transmittance can be measured by the method shown in FIG. 2 described above. That is, the linear transmitted light quantity and the linear transmittance are measured for each incident light angle so that the straight line V shown in FIG. 2 coincides with the C-C axis shown in FIG. 5 (the normal direction is set to 0°). An optical profile is obtained from the obtained data, and the maximum linear transmittance and the minimum linear transmittance can be obtained from this optical profile.

Further, the maximum linear transmittance and the minimum linear transmittance of the anisotropic optical film 100 (the anisotropic light diffusion layer 120) can be adjusted by design parameters at the time of manufacture. Examples of the parameters include the composition of the coating film, the film thickness of the coating film, the temperature applied to the coating film at the time of formation of the structure, and the like. The appropriate selection and preparation of the composition of the coating film changes the maximum linear transmittance and the minimum linear transmittance. With design parameters, the maximum linear transmittance and the minimum linear transmittance tend to be lower as the film thickness is thick, and they tend to be higher as the film thickness is thin. The higher the temperature, the lower the maximum linear transmittance and the minimum linear transmittance tend to be, and the lower the temperature, the higher the maximum linear transmittance and the minimum linear transmittance tend to be. By combining these parameters, it is possible to appropriately adjust the maximum linear transmittance and the minimum linear transmittance.

2-3-2. Diffusion Width

According to the above method, the maximum linear transmittance and the minimum linear transmittance of the anisotropic optical film 100 are obtained, and the linear transmittance of the intermediate value between the maximum linear transmittance and the minimum linear transmittance is obtained. Two incident light angles with respect to the linear transmittance of this intermediate value are read. In the optical profile, the normal direction is 0°, and the incident light angle is shown in the negative direction and the positive direction. Therefore, the incident light angle and the incident light angle corresponding to the intersection may have a negative value in some cases. If the values of the two intersections have a positive incident light angle value and a negative incident light angle value, the sum of the absolute value of the negative incident light angle value and the positive incident light angle value represents the diffusion width, which is the angle range of the diffusion region of incident light. If the values of the two intersections are both positive, the difference obtained by subtracting the smaller value from the larger value represents the diffusion width, which is the angle range of the incident light angle.

If the values at the two intersections are both negative, take the absolute values of the respective values, and the difference obtained by subtracting the smaller value from the larger value is the diffusion width, which is the angle range of the incident light angle.

2-3-3. Scattering Central Axis

Figure 6:
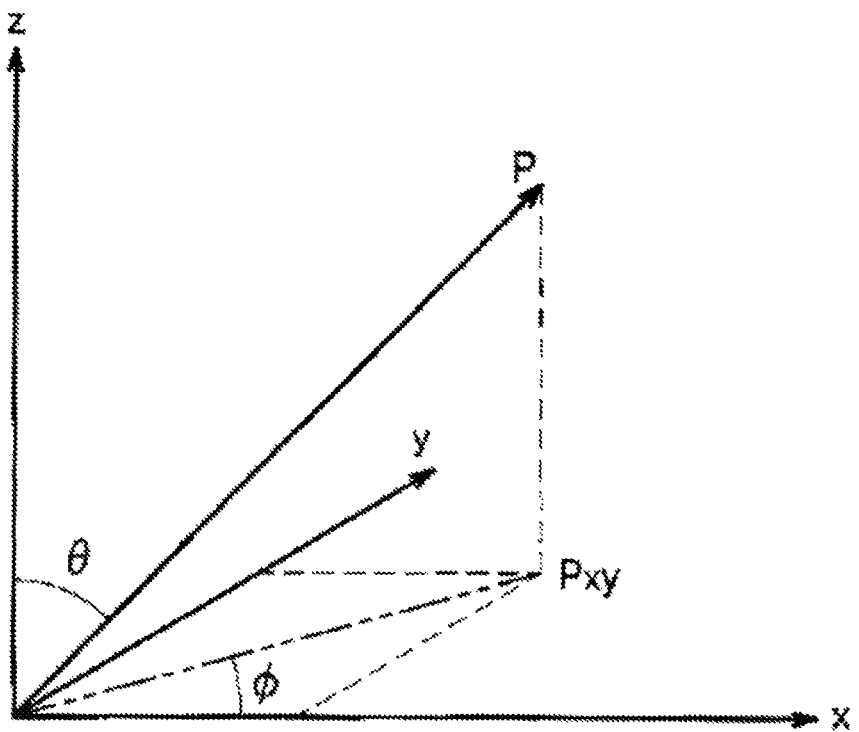
FIG. 6 is a three-dimensional polar coordinate display for explaining the scattering central axis in the anisotropic light diffusion layer according to the present embodiment.

Next, with reference to FIG. 6, a scattering central axis P in the anisotropic light diffusion layer will be described. FIG. 6 is a three-dimensional polar coordinate display for explaining the scattering central axis P in the anisotropic light diffusion layer 120.

The anisotropic light diffusion layer has at least one scattering central axis. As described above, the scattering central axis is a direction in which coincides with the incident light angle with respect to which light diffusibility has a substantially symmetric property when changing the incident light angle to the anisotropic optical film (anisotropic light diffusion layer). Note that the incident light angle (scattering central axis angle) at this time can be obtained by observing the inclination angle of the pillar structure in the cross sectional shape of the anisotropic light diffusion layer with an optical microscope, under the condition that the optical profile of the anisotropic light diffusion layer is measured and the center portion of the diffusion region in this optical profile or the direction (film thickness direction) perpendicular to the plane of the anisotropic light diffusion layer is defined as the normal direction. In the present invention, the scattering central axis angle and the inclination angle of the pillar structure are assumed to be synonymous.

Specifically, according to the three-dimensional polar coordinate display as shown in FIG. 6, when the surface of the anisotropic light diffusion layer 120 is defined as the xy plane and the normal line is defined as the z axis, the scattering central axis is expressed by the polar angle θ and the azimuth angle φ. That is, Pxy in FIG. 6 can be regarded as the length direction of the scattering central axis projected on the surface of the anisotropic light diffusion layer.

Further, the polar angle θ (that is, the scattering central axis angle) of the scattering central axis P of the pillar structure 123 is preferably −5° to +5°, and more preferably −3° to +3°. Naturally, the most favorable angle is ±0°. When the scattering central axis angle is larger than +5° or less than −5°, the brightness in the front direction of the reflective display device cannot be sufficiently improved.

2-3-4. Refractive Index

The anisotropic light diffusion layer 120 is obtained by curing a composition containing a photopolymerizable compound. As the composition, the following combinations can be used.

(1) use of a single photopolymerizable compound
(2) use by mixing a plurality of photopolymerizable compounds
(3) use by mixing a single or a plurality of photopolymerizable compound(s) and a polymer compound not having photopolymerizability.

It is conjectured that in any of the above combinations, a microscopic structure of micron order having a different refractive index is formed in the anisotropic light diffusion layer 120 by light irradiation, and accordingly, it seems that the specific anisotropic light diffusion characteristics shown in this embodiment are developed. Therefore, in (1) above, it is preferable that the compound having a large change in the refractive index before and after photopolymerization is used, and in (2) and (3), it is preferable that a plurality of materials having different refractive indexes are combined. Here, the change in refractive index and the difference in refractive index indicate a change and a difference of preferably 0.01 or more, more preferably 0.05 or more, and still more preferably 0.10 or more.

Here, when the refractive index of the matrix region 121 is higher than the refractive index of the pillar structure 123, the matrix region 121 is regarded as a high refractive index region, and the plurality of pillar structures 123 is regarded as a low refractive index region. The difference between a refractive index of the matrix region 121 (high refractive index region) and a refractive index of the plurality of pillar structures 123 (low refractive index region) is, for example, preferably in the range of 0.01 to 0.20, more preferably in the range of 0.03 to 0.20, and still more preferably in the range of 0.05 to 0.15. If the difference in the refractive index is less than 0.01, sufficient anisotropic scattering property cannot be exhibited. To the contrary, if it exceeds 0.20, light interference (rainbow) occurs and visibility deteriorates, so that neither is suitable.

2-3-5. Haze Value

The haze value of the anisotropic light diffusion layer 120 is preferably 60% or more, more preferably 80% or more, and still more preferably 90% or more. It is particularly preferably less than 98%. Here, the haze value (Hz %) is a value calculated by the following expression while measuring diffuse transmittance (%) and total light transmittance (%) in accordance with JIS K7105. Hz (%)=(diffuse transmittance/total light transmittance)×100

3. Isotropic Light Diffusion Layer 200

An isotropic light diffusion layer 200 (for example, FIG. 7) is a layer containing a light-transmitting resin as a base material and fine particles for diffusing light by a difference between a refractive index of the fine particles and a refractive index of the base material. The isotropic light diffusion layer 200 diffuses light irrespective of the incident angle of light and has no directionality in diffusibility. More specifically, the isotropic light diffusion layer 200 has properties in which when the light is diffused by the isotropic light diffusion layer 200, the degree of diffusion (shape of spreading diffused light) of the diffused light (emitted light) in a plane parallel to the isotropic light diffusion layer 200 does not change depending on the direction in the same plane.

3-1. Resin Base Material

Conventionally, acrylic resin, polyester resin, epoxy resin, polyurethane resin, silicone resin, and the like are known as the resin constituting the isotropic light diffusion layer 200. The acrylic resin is particularly preferable because it has high optical transparency, good workability, and is relatively inexpensive. Further, adhesiveness may be imparted to the resin so that the isotropic light diffusion layer 200 can be easily laminated with another member (for example, a reflective display device). In this case, an adhesive made of acrylic resin is preferably used in the present embodiment.

3-2. Fine Particles, Other Components

Fine particles to be mixed/dispersed in the resin have preferably a refractive index different from that of the resin serving as the base material, and are preferably colorless or white fine particle in order to prevent coloring of the transmitted light. For example, inorganic fine particles, white pigments, resin fine particles, and the like are used. Specific examples thereof include silica fine particles, alumina fine particles, zirconium fine particles, silicone fine particles, acrylic resin fine particles, polystyrene resin fine particles, styrene-acrylic copolymer resin fine particles, polyethylene resin fine particles, and epoxy resin fine particles. Further, one or two or more crosslinking agents such as metal chelate-based agent, isocyanate-based agent, epoxy-based agent, etc. may be mixed in the resin as required.

Furthermore, as other components for forming the isotropic light diffusion layer 200, a thickener, a surfactant, a dispersant, a plasticizer, a leveling agent, and the like can be added in addition to an initiator such as a photoinitiator and as a thermal curing initiator, and a solvent.

3-3. Refractive Index

The difference between the refractive index of the resin serving as the base material (the B method according to JIS K-7142) and the refractive index of the fine particles is preferably in the range of 0.01 to 0.30, and more preferably in the range of 0.02 to 0.20.

In the present embodiment, it is preferable to use the refractive index (high refractive index region) of the acrylic adhesive and the silicone resin fine particles (low refractive index region). The refractive index of the silicone resin fine particles is 1.40 to 1.45, and it has a refractive index slightly lower than 1.45 to 1.55 of the refractive index of the acrylic adhesive, so that it has a higher light transmittance than other materials, has little back scattering and depolarization, and is excellent for application to reflective display devices.

3-4. Average Particle Diameter

The average particle diameter of the fine particles is preferably 0.1 to 20 μm, and more preferably 1 to 10 μm. When the average particle diameter is less than 0.1 μm, the light diffusing performance is low and the metallic luster of the light reflecting plate is visible, so that the paper white property cannot be obtained. On the other hand, when the average particle diameter exceeds 20 μm, the particles are too rough, so that a mat pattern or glare appears on a background of the screen, and the contrast is lowered. Here, the average particle diameter is measured by the coulter counter method.

3-5. Content

The content of fine particles in the isotropic light diffusion layer 200 is preferably 5.0 to 50.0% by weight, and more preferably 7.5 to 45% by weight. When the content is less than 5.0% by weight, the light diffusibility decreases, and when it exceeds 50.0% by weight, it is difficult to uniformly disperse the fine particles in the isotropic light diffusion layer 200, and optical characteristics such as light diffusibility deteriorate.

3-6. Haze Value

The haze value of the isotropic light diffusion layer 200 is preferably 40% or more. This is because if the haze value is less than 40%, it is impossible to give a paper white background to the reflective display device to be described later. The haze value of the isotropic light diffusion layer 200 is more preferably 50% or more. A preferable upper limit value of the haze value is less than 80%. Here, the haze value (Hz %) is a value calculated by the following expression by measuring diffuse transmittance (%) and total light transmittance (%) in accordance with JIS K7105. Hz (%)= (diffuse transmittance/total light transmittance)×100

3-7. Total Light Transmittance

The total light transmittance of the isotropic light diffusion layer 200 is preferably 85% or more. When the total light transmittance is less than 85%, the screen of the reflective display device described later is dark and the image contrast may be lowered. The total light transmittance of the isotropic light diffusion layer 200 is more preferably 90% or more.

The thickness of the isotropic light diffusion layer 200 is preferably 5 μm to 100 μm, more preferably 10 μm or more and less than 50 μm, and still more preferably 10 μm or more and less than 25 μm.

4. Arrangement Configuration of Anisotropic Optical Film 100 and Isotropic Light Diffusion Layer 200 (Light Diffusion Film Laminate 30)

Figure 7:
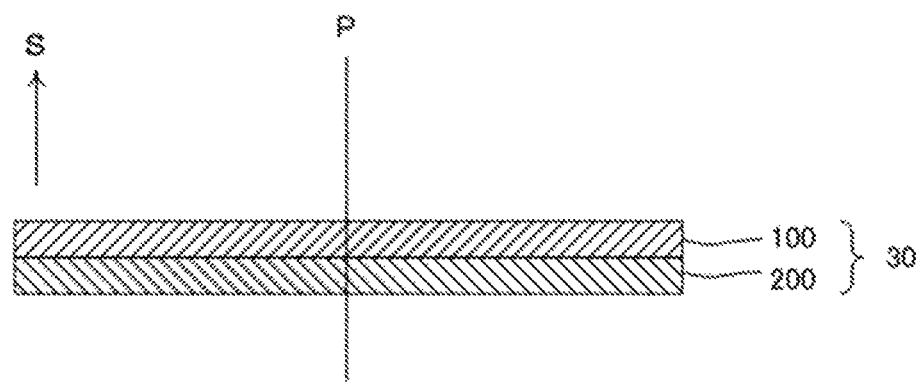
FIG. 7 is an explanatory diagram showing an arrangement configuration of an anisotropic optical film (anisotropic light diffusion layer) and an isotropic light diffusion layer according to this embodiment.

As shown in FIG. 7, a light diffusion film laminate 30 according to this embodiment is an anisotropic optical film (laminate) in which the anisotropic optical film 100 and the isotropic light diffusion layer 200 are laminated. Preferably, the light diffusion film laminate 30 includes the anisotropic optical film 100 which is disposed on the external light side such as the sun side or on the viewer's viewing side (outer surface side), and the isotropic light diffusion layer 200 opposite to the anisotropic optical film 100 (opposite to the viewer side). Such an arrangement makes it possible to effectively operate the anisotropy of the anisotropic optical film 100. It is possible to reduce the change in the brightness of the image without reducing the visibility not only from a predetermined observation position (for example, the front direction of the screen), but also from a slightly inclined direction from the predetermined observation position (for example, the front direction of the screen), thereby having excellent display characteristics.

The anisotropic optical film 100 used in this embodiment is, for example, the anisotropic optical film 100 having a columnar structure. However, the columnar structure in the present invention includes, for example, an anisotropic light diffusion layer having a pillar structure having an aspect ratio (2 to 40) which is set between the aspect ratio of the columnar structure and the aspect ratio of the tabular structure. The isotropic light diffusion layer 200 is characterized by using fine particles having a refractive index different from that of the resin serving as a base material and has diffusibility independent of the incident angle of light, so that the diffusing function of the anisotropic optical film 100 can be compensated. Here, the light incident into the light diffusion film laminate 30 means, external light such as the sunlight and a room, and does not include light from a light projector that projects a light image on the screen.

As shown in FIG. 7, the anisotropic optical film 100 has one scattering central axis P, and the scattering central axis P is preferably in a range of −5° or more and +5° or less with respect to the normal direction S (film thickness direction of the film) of the anisotropic optical film 100. When the scattering central axis P (the incident light angle in this direction is 0°) coincides with the normal direction S, the orientation direction (extending direction) of the plurality of pillar structures 123 of the anisotropic optical film 100 is formed so as to be parallel to the scattering central axis P and the normal direction S.

The ratio, which is the thickness the anisotropic light diffusion layer 100: the thickness of the isotropic optical film 200, is preferably 1:1 to 10:1, more preferably 1:1 to 5:1, and still more preferably 1:1 to 2:1.

A PET film or the like may be laminated on the outer surface side of the anisotropic optical film 100 via, for example, an adhesive.

In this manner, a light diffusion film laminate 30 in which the anisotropic optical film 100 and the isotropic light diffusion layer 200 are laminated, more specifically, the light diffusion film laminate 30 in which the anisotropic optical film 100 is disposed on the surface on which external light such as the sun is incident or on the viewer's viewing side (outer surface side) and in which the isotropic light diffusion layer 200 is disposed on the back surface (one surface opposite to the viewing side) of the anisotropic optical film 100, is applied to, for example, a reflective display device including a reflective member (not shown) (for example, a mirror for reflecting light such as a reflecting film, a reflecting plate, etc.), so that it is possible to minimize the inhibition of the anisotropic effect of the anisotropic optical film 100 at the time of incidence of external light and emission of reflected light, and it is possible to reduce the change in the brightness of the image without lowering the visibility in the front direction of the screen of the reflective display device and in the direction inclined slightly from the front of the screen.

More specifically, the anisotropic optical film 100 has properties in which light diffusion preferentially occurs in the diffusion region and light transmission preferentially occurs in the non-diffusion region.

Here, the scattering central axis angle with respect to the normal direction (film thickness direction of the film) of the anisotropic optical film 100 is set to +15°, and the incident light angle of external light such as the sun with respect to the normal direction of the anisotropic optical film 100 is set to −30°. In this case, since the incident light angle is largely different from the scattering central axis angle, and the anisotropic optical film 100 is a non-diffusion region, the light is hardly diffused in the anisotropic optical film 100, and light transmission is preferential. Light reaches the reflective layer which is a reflective member in the reflective display device (or reaches the reflective layer in the reflective display device after diffused in the isotropic light diffusion layer) and is regularly reflected by the reflective layer.

The regularly reflected light enters from the surface (the back surface of the anisotropic optical film 100) opposite to the surface on which the incident light of the anisotropic optical film 100 is incident (depending on the configuration, after light is transmitted through the isotropic light diffusion layer). The anisotropic optical film 100 is the diffusion region where the difference between the incident light angle of the reflected light to the anisotropic optical film 100 and the scattering central axis angle is small (for example, +30° with respect to the normal direction of the anisotropic optical film 100), light is strongly diffused in the anisotropic optical film 100.

That is, since the anisotropic optical film 100 diffuses the incident light only in a predetermined range, it may maintain a constant brightness (for example, it is possible to set a scattering angle region whose diffusion reflected light intensity is 95% or more of the peak value of the diffusion reflected light intensity of the light diffusion film laminate 30 to a predetermined angle such as −10° or more and +10° or less, or the like).

As described above, the isotropic light diffusion layer 200 includes fine particles having diffusibility of diffusing light, diffuses light irrespective of the incident angle of light, and has a property (isotropy) of not having directivity in diffusibility. Therefore, it is possible to widen the diffusion range by isotropically diffusing the light by the isotropic light diffusion layer 200, and to prevent the visibility in the oblique direction deviated from the front direction from deteriorating.

As a result, the light diffusion film laminate 30 diffuses the incident light only in a predetermined range, so that the light diffusion film laminate 30 can maintain a certain brightness and can prevent the visibility from deteriorating even in a position away from a predetermined observation position (for example, in an oblique direction deviated from the front of the screen).

Reflective Display Device

The reflective display device according to the present embodiment does not have any particular limitation as long as it has a reflection function. Examples of a specific display method applied to the reflective display device include known techniques such as an electronic powder method, a liquid crystal method (cholesteric liquid crystal, bistable nematic liquid crystal, pixel memory liquid crystal, etc.), an electrowetting method, an electrochromic method, and an electrophoretic method (microcapsule, etc.).

Here, the light diffusion film laminate 30 in the reflective display device of the present invention is laminated on the surface of the planar substrate (external light incidence surface side), which is located on the external light incidence surface side (the viewer's viewing side, the reflected light viewing side) of the reflective display device, and which is located on the front side from the image forming portion in each display method (for example, a microcapsule in the electrophoretic method, a portion of enclosing the electronic powder in the electronic method, a portion of sealing water and oil film in electrowetting method, a liquid crystal layer in the liquid crystal method etc.).

Here, the planar substrate specifically means glass, a resin molded body, a film, or the like.

In the light diffusion film laminate 30 of the present invention, the light diffusion film laminate 30 of the present invention is laminated on the surface of the planar substrate (the viewer's viewing side, the reflected light viewing side). At this time, which of the anisotropic optical film 100 and the isotropic light diffusion layer 200 of the light diffusion film laminate 30 is to be laminated on the planar substrate surface of the reflective display device is not predetermined. It is preferable to laminate them on the planar substrate such that the anisotropic optical film 100 in the light diffusion film laminate 30 is located on the external light incidence surface side (the viewer's viewing side, the reflected light viewing side), and the isotropic light diffusion layer 200 is located on the image forming portion side of the reflective display device.

When the isotropic light diffusion layer 200 is laminated on the surface of the planar substrate so that the isotropic light diffusion layer 200 is located on the image forming portion side of the reflective display device, if the isotropic light diffusion layer is an adhesive, the lamination may be performed via the isotropic light diffusion layer 200.

On the other hand, when the anisotropic optical film 100 is laminated on the planar substrate surface such that the anisotropic optical film 100 is located on the image forming portion side of the reflective display device, the lamination may be performed via a known adhesive having transparency.

5. Example

Next, the present invention will be described in more detail with reference to Examples and Comparative Examples, but the present invention is not limited to these Examples.

According to the following method, the light diffusion film laminate of the present invention (the anisotropic optical film and the isotropic light diffusion layer) and the light diffusion film laminate of Comparative Examples (the anisotropic optical film and the isotropic light diffusion layer) were prepared.

Example 1

Anisotropic Optical Film

Using a dispenser, a partition wall having a height of 0.04 mm made of a curable resin was formed around the entire edge of a 100 μm thick PET film (Trade name: A4300, manufactured by TOYOBO CO., LTD.). The following photocuring resin composition was filled therein and covered with a PET film.

Silicone urethane acrylate (refractive index: 1.460, weight average molecular weight: 5890) 20 parts by weight
(Trade name: 00-225/TM18, manufactured by RAHN AG)
Neopentyl glycol diacrylate (refractive index: 1.450) 30 parts by weight
(Trade name Ebecryl 145, manufactured by Daicel-Cytec Co., Ltd.)
EO adduct diacrylate of bisphenol A (refractive index: 1.536) 15 parts by weight
(Trade name Ebecryl 150, manufactured by Daicel-Cytec Co., Ltd.)
Phenoxyethyl acrylate (refractive index: 1.518) 40 parts by weight
(Trade name: Light Acrylate PO-A, manufactured by Kyoeisha Chemical Co., Ltd.)
2,2-dimethoxy-1,2-diphenylethan-1-one 4 parts by weight
(Trade name: Irgacure 651, manufactured by BASF SE)

The liquid film having a thickness of 0.04 mm sandwiched between PET films on both sides was heated, and from the top, parallel UV light emitted from an epi-illumination unit of a UV spot light source (Trade name: L2859-01, manufactured by Hamamatsu Photonics K.K.) was radiated perpendicularly from the normal direction of the liquid film surface at an irradiation intensity of 5 mW/cm$^2$ for 1 minute. As a result, a single layer of an anisotropic optical film (anisotropic light diffusion layer) in which an anisotropic diffusion layer with a thickness of 40 μm and having many pillar structures is formed between the PET films was obtained.

Figure 8:
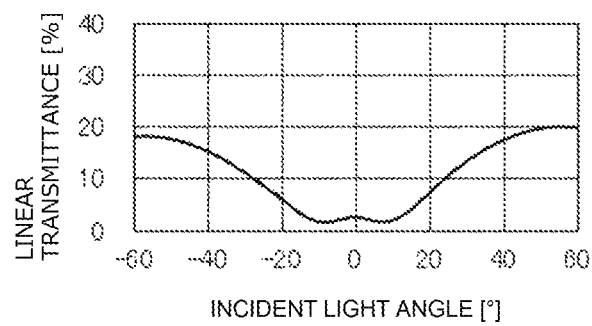
FIG. 8 is a graph showing evaluation results obtained by evaluating the light diffusibility of the anisotropic optical films obtained in Examples 1 to 4 and Comparative Example 3.
Figure 8:
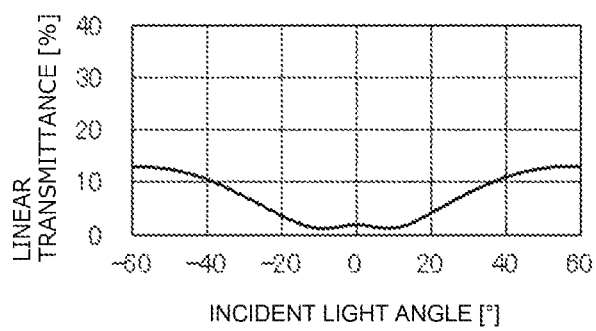
Figure 8:
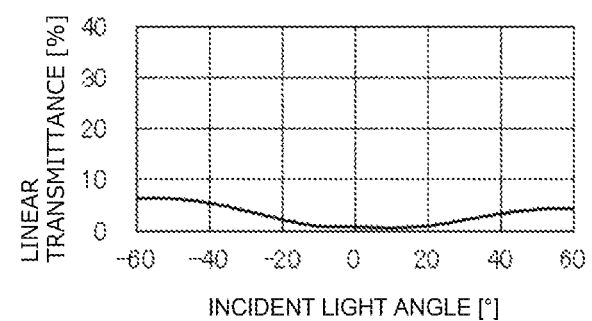
Figure 8:
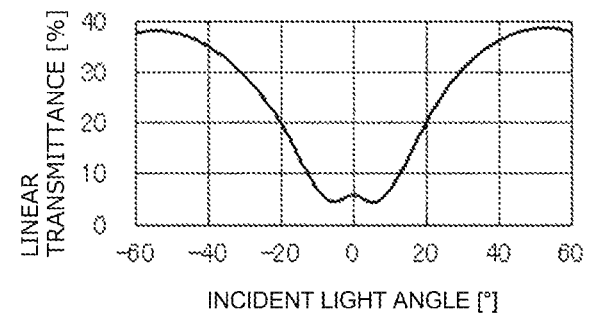
Figure 8:
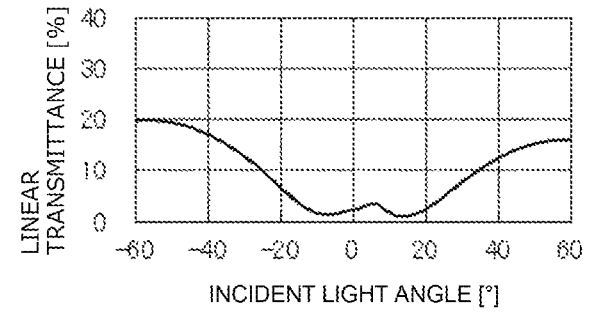

The haze value of the anisotropic optical film obtained after peeling off the PET film was measured to be 93.1%. As a result of evaluation of light diffusibility, the scattering central axis angle was 0°. The optical profile is shown in FIG. 8(*a*) (the horizontal axis shows the incident light angle and the vertical axis shows the linear transmittance). The haze value was measured using the haze meter NDH 2000 manufactured by NIPPON DENSHOKU INDUSTRIES CO., LTD., and the light diffusibility was measured using a goniophotometer manufactured by GENESIA.

Furthermore, when the pillar structure was observed with an optical microscope, the aspect ratio of the average long diameter to the average short diameter was 1.0.

Isotropic Light Diffusion Layer

The coating material of the following components was applied to a release PET film (trade name: 38C, manufactured by LINTEC Corporation) having a thickness of 38 μm using a comma coater so that the film thickness after solvent drying was 25 μm. After drying it to form an isotropic light diffusion layer, a release PET film (Trade name: 3801, manufactured by LINTEC Corporation) having a thickness of 38 μm was laminated to obtain an isotropic light diffusion layer with the PET.

Acrylic adhesive (refractive index: 1.47, total solid content concentration: 18.8%, solvent: ethyl acetate, methyl ethyl ketone) 100 parts by weight
(Trade name: SK Dyne TM 206, manufactured by Soken Chemical & Engineering Co., Ltd.)
Isocyanate curing agent 0.5 parts by weight
(Trade name: L-4, manufactured by Soken Chemical & Engineering Co., Ltd.)
Epoxy curing agent 0.02 parts by weight
(Trade name: E-5XM, manufactured by Soken Chemical & Engineering Co., Ltd.)
Silicone resin spherical fine particles (refractive index: 1.43, average particle diameter: 4.5 μm) 7.4 parts by weight
(Trade name: Tospearl 145, manufactured by Momentive Performance Materials Inc.)

The PET film of this isotropic light diffusion layer was peeled off and the haze value was measured. As a result, the haze value was 50.0%, and the total light transmittance was 89%. The haze value and total light transmittance were measured with the haze meter NDH 2000 manufactured by NIPPON DENSHOKU INDUSTRIES CO., LTD.

The anisotropic optical film and the isotropic light diffusion layer were laminated after peeling off the PET film on the laminating surfaces of the anisotropic optical film and the isotropic light diffusion layer, and a light diffusion film laminate of Example 1 with two layers of an anisotropic optical film/isotropic light diffusion layer was obtained.

Example 2

Anisotropic Optical Film

The film was manufactured in the same manner as in the anisotropic optical film of Example 1 except that the height of the partition wall was set to 0.05 mm to obtain an anisotropic optical film (anisotropic light diffusion layer) of a single layer in which an anisotropic diffusion layer with a thickness of 50 μm and having many pillar structures was formed on the PET film. The haze value of the anisotropic optical film obtained after peeling off the PET film was measured to be 95.6%. As a result of evaluation of light diffusibility, the scattering central axis angle was 0°. The optical profile is shown in FIG. 8(*b*) (the horizontal axis shows the incident light angle and the vertical axis shows the linear transmittance). The haze value was measured using the haze meter NDH 2000 manufactured by NIPPON DEN- SHOKU INDUSTRIES CO., LTD., and the light diffusibility was measured using a goniophotometer manufactured by GENESIA.

Furthermore, when the pillar structure was observed with an optical microscope, the aspect ratio of the average long diameter to the average short diameter was 1.0.

Isotropic Light Diffusion Layer

The layer was manufactured in the same manner as in the isotropic light diffusion layer of Example 1 except that a coating material of the following components was used to obtain an isotropic light diffusion layer with the PET.

Acrylic adhesive (refractive index: 1.47, total solid content concentration: 18.8%, solvent: ethyl acetate, methyl ethyl ketone) 100 parts by weight
(Trade name: SK Dyne TM 206, manufactured by Soken Chemical & Engineering Co., Ltd.)
Isocyanate curing agent 0.5 parts by weight
(Trade name: L-4, manufactured by Soken Chemical & Engineering Co., Ltd.)
Epoxy curing agent 0.02 parts by weight
(Trade name: E-5XM, manufactured by Soken Chemical & Engineering Co., Ltd.)
Silicone resin spherical fine particles (refractive index: 1.43, average particle diameter: 4.5 µm) 20.0 parts by weight
(Trade name: Tospearl 145, manufactured by Momentive Performance Materials Inc.)

The PET film of this isotropic light diffusion layer was peeled off and the haze value was measured. As a result, the haze value was 75.0%, and the total light transmittance was 89%. The haze value and total light transmittance were measured with the haze meter NDH 2000 manufactured by NIPPON DENSHOKU INDUSTRIES CO., LTD.

The anisotropic optical film and the isotropic light diffusion layer were laminated after peeling off the PET film on the laminating surfaces of the anisotropic optical film and the isotropic light diffusion layer, and a light diffusion film laminate of Example 2 with two layers of an anisotropic optical film/isotropic light diffusion layer was obtained.

Example 3

Anisotropic Optical Film

The film was manufactured in the same manner as in the anisotropic optical film of Example 1 except that the height of the partition wall was set to 0.08 mm to obtain an anisotropic optical film (anisotropic light diffusion layer) of a single layer in which an anisotropic diffusion layer with a thickness of 80 µm and having many pillar structures was formed between the PET films. The haze value of the anisotropic optical film obtained after peeling off the PET film was measured to be 96.2%. As a result of evaluation of light diffusibility, the scattering central axis angle was 4°. The optical profile is shown in FIG. 8(c) (the horizontal axis shows the incident light angle and the vertical axis shows the linear transmittance). The haze value was measured using the haze meter NDH 2000 manufactured by NIPPON DENSHOKU INDUSTRIES CO., LTD., and the light diffusibility was measured using a goniophotometer manufactured by GENESIA.

Furthermore, when the pillar structure was observed with an optical microscope, the aspect ratio of the average long diameter to the average short diameter was 1.1.

Isotropic Light Diffusion Layer

The layer was manufactured in the same manner as in the isotropic light diffusion layer of Example 2 to obtain an isotropic light diffusion layer with the PET.

The PET film of this isotropic light diffusion layer was peeled off and the haze value was measured. As a result, the haze value was 75.0%, and the total light transmittance was 89%. The haze value and total light transmittance were measured with the haze meter NDH 2000 manufactured by NIPPON DENSHOKU INDUSTRIES CO., LTD.

The anisotropic optical film and the isotropic light diffusion layer were laminated after peeling off the PET film on the laminating surfaces of the anisotropic optical film and the isotropic light diffusion layer, and a light diffusion film laminate of Example 3 with two layers of an anisotropic optical film/isotropic light diffusion layer was obtained.

Example 4

Anisotropic Optical Film

The film was manufactured in the same manner as in the anisotropic optical film of Example 1 except that the height of the partition wall was set to 0.02 mm to obtain an anisotropic optical film (anisotropic light diffusion layer) of a single layer in which an anisotropic diffusion layer with a thickness of 20 µm and having many pillar structures was formed between the PET films. The haze value of the anisotropic optical film obtained after peeling off the PET film was measured to be 68.1%. As a result of evaluation of light diffusibility, the scattering central axis angle was 0°. The optical profile is shown in FIG. 8(d) (the horizontal axis shows the incident light angle and the vertical axis shows the linear transmittance). The haze value was measured using the haze meter NDH 2000 manufactured by NIPPON DENSHOKU INDUSTRIES CO., LTD., and the light diffusibility was measured using a goniophotometer manufactured by GENESIA.

Furthermore, when the pillar structure was observed with an optical microscope, the aspect ratio of the average long diameter to the average short diameter was 1.0.

Isotropic Light Diffusion Layer

The layer was manufactured in the same manner as in the isotropic light diffusion layer of Example 2 to obtain an isotropic light diffusion layer with the PET.

The PET film of this isotropic light diffusion layer was peeled off and the haze value was measured. As a result, the haze value was 75.0%, and the total light transmittance was 89%. The haze value and total light transmittance were measured with the haze meter NDH 2000 manufactured by NIPPON DENSHOKU INDUSTRIES CO., LTD.

The anisotropic optical film and the isotropic light diffusion layer were laminated after peeling off the PET film on the laminating surfaces of the anisotropic optical film and the isotropic light diffusion layer, and a light diffusion film laminate of Example 4 with two layers of an anisotropic optical film/isotropic light diffusion layer was obtained.

Comparative Example 1

The anisotropic optical film layer and the isotropic light diffusion layer manufactured in Example 1 were laminated in the arrangement which is an arrangement opposite to that of Example 1, and a light diffusion film laminate of Comparative Example 1 with two layers of isotropic light diffusion layer/anisotropic optical film was obtained.

Comparative Example 2

The anisotropic optical film of Comparative Example 2 consisting only of a single layer of anisotropic optical film which is the anisotropic optical film of Example 2 without the isotropic diffusion layer laminated was obtained.

Comparative Example 3

Anisotropic Optical Film

The film was manufactured in the same manner as in the anisotropic optical film of Example 1 except that the irradiation angle of the parallel UV rays was inclined by an angle of 6° with respect to the normal direction of the liquid film surface to obtain an anisotropic optical film (anisotropic light diffusion layer) of a single layer in which an anisotropic diffusion layer with a thickness of 40 μm and having many pillar structures was formed between the PET films. The haze value of the anisotropic optical film obtained after peeling off the PET film was measured to be 95.2%. As a result of evaluation of light diffusibility, the scattering central axis angle was 6°. The optical profile is shown in FIG. 8(e) (the horizontal axis shows the incident light angle and the vertical axis shows the linear transmittance). The haze value was measured using the haze meter NDH 2000 manufactured by NIPPON DENSHOKU INDUSTRIES CO., LTD., and the light diffusibility was measured using a goniophotometer manufactured by GENESIA.

Furthermore, when the pillar structure was observed with an optical microscope, the aspect ratio of the average long diameter to the average short diameter was 1.1.

Isotropic Light Diffusion Layer

The layer was manufactured in the same manner as in the isotropic light diffusion layer of Example 1 to obtain an isotropic light diffusion layer with the PET.

The PET film of this isotropic light diffusion layer was peeled off and the haze value was measured. As a result, the haze value was 50.0%, and the total light transmittance was 89%. The haze value and total light transmittance were measured with the haze meter NDH 2000 manufactured by NIPPON DENSHOKU INDUSTRIES CO., LTD.

The anisotropic optical film and the isotropic light diffusion layer were laminated after peeling off the PET film on the laminating surfaces of the anisotropic optical film and the isotropic light diffusion layer, and a light diffusion film laminate of Comparative Example 3 with two layers of an anisotropic optical film/isotropic light diffusion layer was obtained.

Evaluation Method

Evaluation was carried out on the light diffusion film laminates of the above Examples and Comparative Examples as follows.

Diffusion Reflected Light Intensity

In the light diffusion film laminates or the anisotropic optical films of Examples 1 to 4 and Comparative Examples 1 to 3, the isotropic light diffusion layer surfaces of Examples 1 to 4 and Comparative Example 3, or the anisotropic optical film surfaces of Comparative Examples 1 and 2 were directly laminated (Examples 1 to 4, Comparative Example 3) or were laminated via a transparent adhesive layer having a layer thickness of 5 μm (Comparative Examples 1 and 2) to an aluminum reflection mirror as a reflective layer for a reflective display device to obtain samples for measurement of diffusion reflected light intensity.

Figure 9:
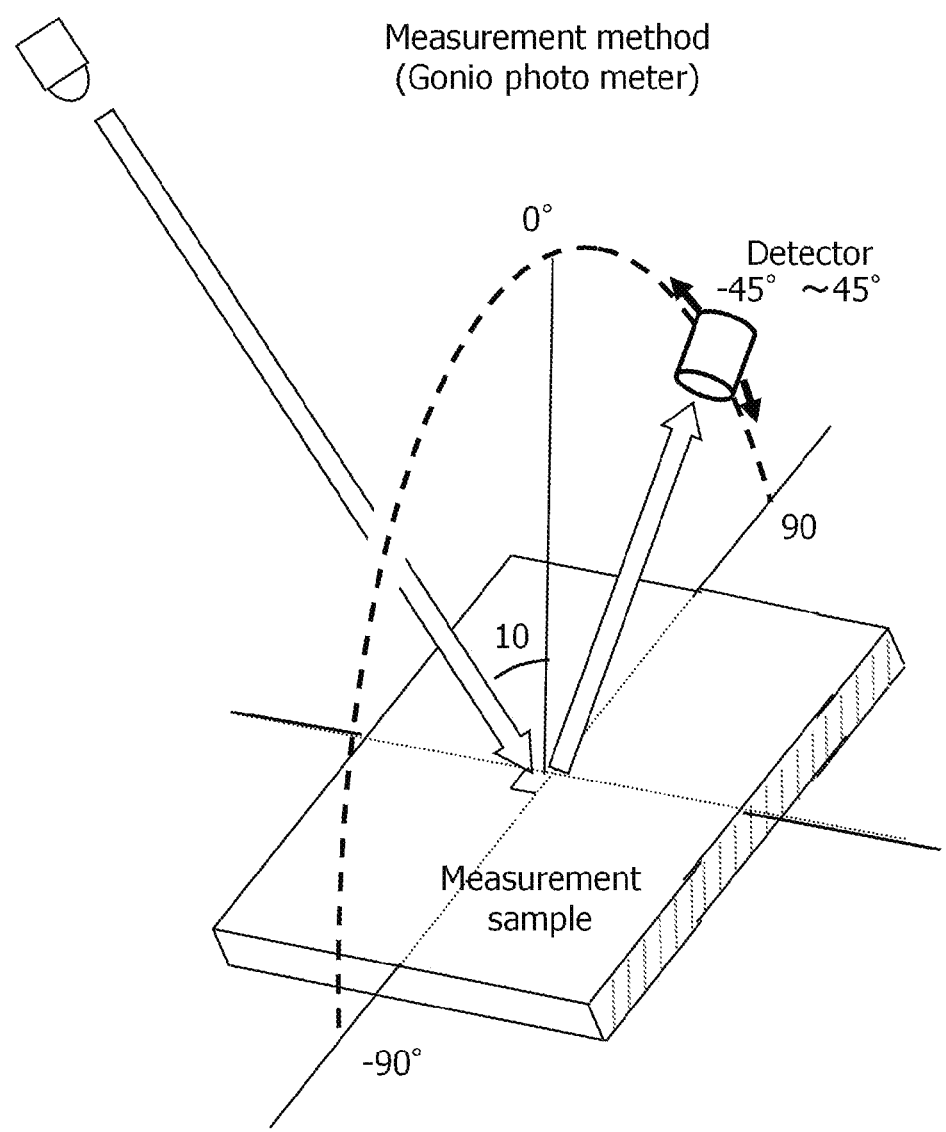
FIG. 9 is a diagram showing a method of measuring diffusion reflected light intensity of the light diffusion film laminate or the anisotropic optical film obtained in Examples 1 to 4 and Comparative Examples 1 to 3.

As shown in FIG. 9, using a goniophotometer (manufactured by GENESIA), which is capable of varying the flood lighting angle of the light source and the light receiving angle of the detector, diffusion reflected light intensity of the light diffusion film laminates of Examples and Comparative Examples was measured.

The light source was placed at an angle of 10° from the normal direction of the surface of the evaluation samples, and the diffusion reflected light intensity in the range of −45° to +45° was measured with the polar angle of the normal line being 0° with respect to the direction in which the azimuth angle of the evaluation samples perpendicular to the light source, which is the diffusion reflected light intensity of the samples.

Figure 10:
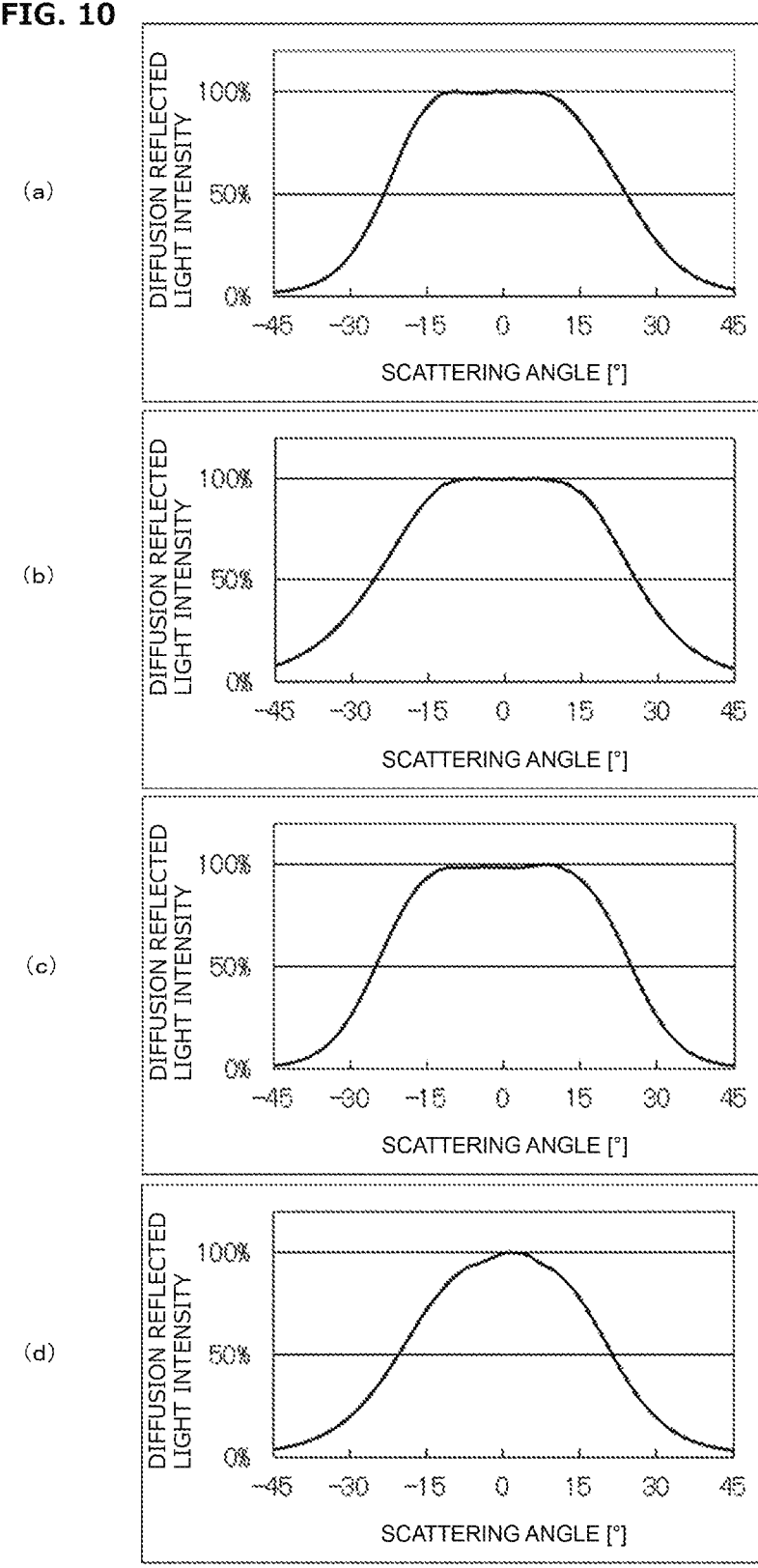
FIG. 10 is a graph showing measurement results of diffusion reflected light intensity of the light diffusion film laminates obtained in Examples 1 to 4 by the measuring method shown in FIG. 9.
Figure 11:
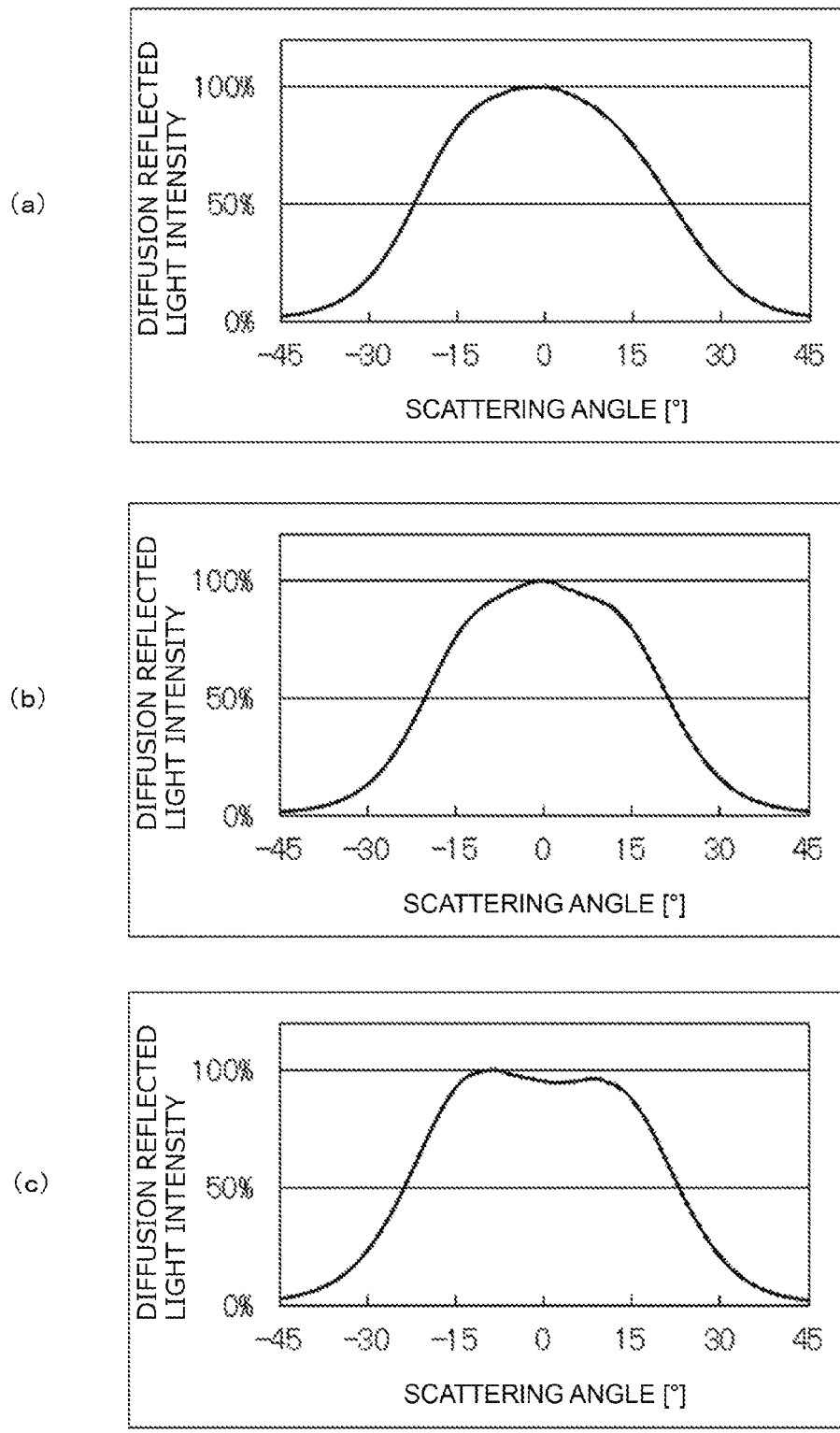
FIG. 11 is a graph showing measurement results of diffusion reflected light intensity of the light diffusion film laminates or the anisotropic optical films obtained in Comparative Examples 1 to 3 by the measuring method shown in FIG. 9.

FIG. 10 and FIG. 11 show graphs of diffusion reflected light intensity of Examples and Comparative Examples. In the present invention, the diffusion reflected light intensity is indicated in a standard value with the maximum being 100%. FIG. 10(a) is a graph of diffusion reflected light intensity of Example 1, FIG. 10(b) is a graph of diffusion reflected light intensity of Example 2, FIG. 10(c) is a graph of diffusion reflected light intensity of Example 3, and FIG. 10(d) is a graph of diffusion reflected light intensity of Example 4. FIG. 11(a) is a graph of diffusion reflected light intensity of Comparative Example 1, FIG. 11(b) is a graph of diffusion reflected light intensity of Comparative Example 2, and FIG. 11(c) is a graph of diffusion reflected light intensity of Comparative Example 3. In FIG. 10 and FIG. 11, the vertical axis represents diffusion reflected light intensity, and the horizontal axis represents scattering angles when the polar angle of the sample normal line is 0°.

Evaluation Result

The chart of the sample using the light diffusion film laminate of Example 1 has a trapezoidal shape, and the scattering angle region for 95% or more of the peak value of diffusion reflected light intensity is −13° or more and +11° or less, and the change in the brightness when the reflective display device is inclined is small.

Further, the chart of the sample using the light diffusion film laminate of Example 2 had a trapezoidal shape, and the scattering angle region for 95% or more of the peak value of diffusion reflected light intensity was −12° or more and +13° or less.

Further, the chart of the sample using the light diffusion film laminate of Example 3 had a trapezoidal shape, and the scattering angle region for 95% or more of the peak value of diffusion reflected light intensity was −14° or more and +13° or less.

Further, the chart of the sample using the light diffusion film laminate of Example 4 has a mountain shape, the scattering angle region for 95% or more of the peak value of diffusion reflected light intensity was −4° or more +7° or less, and since the change in brightness is large only by slightly inclining the reflective display device, it is hard to see the device.

On the other hand, the chart of the sample using the light diffusion film laminate of Comparative Example 1 had a mountain shape, the scattering angle region for 95% or more of the peak value of diffusion reflected light intensity was −9° or more and +5° or less, and since the change in brightness is large only by slightly inclining the reflective display device, it is hard to see the device.

Further, the chart of the sample using the anisotropic optical film of Comparative Example 2 has a mountain shape, the scattering angle region for 95% or more of the peak value of diffusion reflected light intensity was −6° or more and +5° or less, and since the change in brightness is large only by slightly inclining the reflective display device, it is hard to see the device.

Further, the chart of the sample using the light diffusion film laminate of Comparative Example 3 has an irregular shape, and the scattering angle region for 95% or more of the peak value of diffusion reflected light intensity was −14° or more and 0° or less, and since the change in brightness is large only by slightly inclining the reflective display device in a certain direction, it is hard to see the device.

Therefore, when the light diffusion film laminate of the example is used for, for example, a reflective display device, since constant brightness is maintained without reducing visibility (a predetermined angle where the scattering angle region, whose diffusion reflected light intensity is 95% or more of the peak value of the diffusion reflected light intensity, corresponds to at least −10° or more and +10° or less) even from a predetermined observation position (for example, the front direction of the screen) and from a position away from the predetermined observation position (for example, an oblique direction deviated from the front of the screen), it is possible to reduce the change in the brightness of the image and to have excellent display characteristics.

Figure 12:
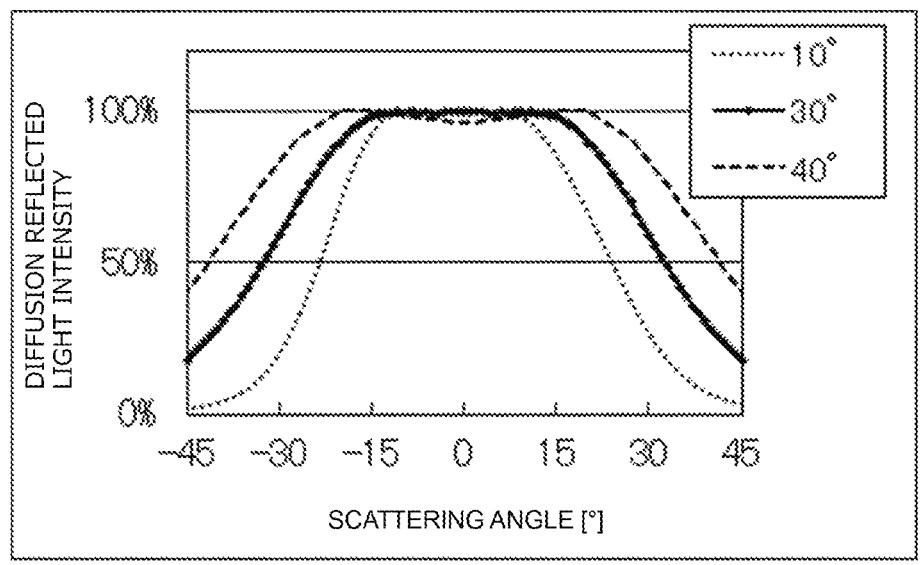
FIG. 12 is a graph showing measurement results of diffusion reflected light intensity where the intensity was measured while changing the angle of the light source with respect to the light diffusion film laminate obtained in Example 1.

In addition, FIG. 12 shows measurement results of diffusion reflected light intensity measured with the angle of the light source changed to 10°, 30°, and 40° with respect to the light diffusion film laminate obtained in Example 1. In FIG. 12, the vertical axis represents diffusion reflected light intensity, and the horizontal axis represents the scattering angle when the polar angle of the sample normal line is 0°.

As shown in FIG. 12, even when the light source is disposed by inclining the surface of the evaluation sample by 10°, 30°, and 40° from the normal direction to measure diffusion reflected light intensity, the chart of the sample using the light diffusion film laminate has a trapezoidal shape. At any angle, the scattering angle region for 95% or of the peak value of the reflected light intensity corresponds to at least −10° or more and +10° or less, and it has been found that the change in the brightness when the reflective display device was inclined is small. When the light source was disposed at an angle of 30° from the normal direction, the scattering angle region for 95% or more of the peak value of the diffusion reflected light intensity was −17° or more and +17° or less. When the light source was disposed at an angle of 40° from the normal direction, the scattering angle region for 95% or more of the peak value of the diffusion reflected light intensity was −23° or more and +23° or less.

In the present embodiment, an example in which the light diffusion film laminate is applied to the reflective display device has been described. Examples of the reflective display device include personal devices such as a tablet terminal such as a smartphone, a wrist watch, a game machine, a notebook personal computer, and may include any device aiming at expanding the visibility of the individual. For this reason, the reflective display device of the present invention is different from, in its purpose, for example, a device (such as a projector screen) for widening the viewing angle so that a large number of people can see easily.

Although the preferred embodiments of the present invention have been described with reference to the drawings, the present invention is not limited to the above-described embodiments. That is, it is understood that other forms or various modifications that can be conceived by those skilled in the art within the scope of the invention described in the claims are also within the technical scope of the present invention.

REFERENCE SIGNS LIST

30 Light diffusion film laminate
100 Anisotropic optical film (anisotropic light diffusion layer)
200 Isotropic light diffusion layer
P Scattering central axis
S Normal line

The invention claimed is:

1. A light diffusion film laminate for a reflective display device, the light diffusion film laminate having optical diffusibility that changes depending on an incident angle of light, and at least transmitting reflected light occurring when incident light is reflected by a reflective layer, the light diffusion film laminate comprising at least:
   an anisotropic light diffusion layer whose linear transmittance varies depending on an incident angle of the light; and
   an isotropic light diffusion layer provided on one surface of the anisotropic light diffusion layer,
   wherein the anisotropic light diffusion layer has
   a matrix region, and a pillar region composed of a plurality of pillar structures, in the anisotropic light diffusion layer,
   wherein a scattering central axis angle of the anisotropic light diffusion layer is −5° or more and +5° or less with respect to a normal direction of the anisotropic light diffusion layer,
   wherein the light diffusion film laminate for the reflective display device includes the anisotropic light diffusion layer and the isotropic light diffusion layer that are layered in this order from a viewing side of the reflective light, and
   wherein a haze value of the anisotropic light diffusion layer is in a range of 80% to 98% and a haze value of the isotropic light diffusion layer is 50% or more and less than 80%.

2. The light diffusion film laminate for the reflective display device according to claim 1,
   wherein when the incident angle of the light is 10° or more and 40° or less with respect to the normal direction, a scattering angle region, whose diffusion reflected light intensity is 95% or more of a peak value of the diffusion reflected light intensity of the light diffusion film laminate, corresponds to at least −10° or more and +10° or less with respect to the normal direction.

3. The light diffusion film laminate for the reflective display device according to claim 1, wherein the isotropic light diffusion layer has a total light transmittance of 85% or more.

4. The light diffusion film laminate for the reflective display device according to claim 1,
   wherein the anisotropic light diffusion layer has a first high refractive index region and a second low refractive index region, wherein the isotropic light diffusion layer has a third high refractive index region and a fourth low refractive index region, wherein a difference between a refractive index of the first high refractive index region and a refractive index of the second low refractive index region is in a range of 0.01 to 0.20, and wherein a difference between a refractive index of the third high refractive index region and a refractive index of the fourth low refractive index region is in a range of 0.01 to 0.30.

5. The light diffusion film laminate for the reflective display device according to claim 1, wherein a ratio, which is a thickness of the anisotropic light diffusion layer: a thickness of the isotropic light diffusion layer, is in a range of 1:1 to 10:1.

6. The light diffusion film laminate for the reflective display device according to claim 1, wherein the plurality of pillar structures are oriented from one surface of the anisotropic light diffusion layer to the other surface of the anisotropic light diffusion layer and an aspect ratio of an average long diameter to an average short diameter is less than 2.

7. The light diffusion film laminate for the reflective display device according to claim 1, wherein
the anisotropic light diffusion layer and the isotropic light diffusion layer are laminated, and
no other layer intervenes between the anisotropic light diffusion layer and the isotropic light diffusion layer such that the anisotropic light diffusion layer is in a direct contact with the isotropic light diffusion layer.

8. The light diffusion film laminate for the reflective display device according to claim 1, wherein
these haze values are calculated in accordance with JIS K7105.

9. A reflective display device, comprising:
a light diffusion film laminate having optical diffusibility that changes depending on an incident angle of light, and at least transmitting reflected light occurring when incident light is reflected by a reflective layer; and
an image forming portion provided on a surface of an isotropic light diffusion layer, the surface being opposite to an anisotropic light diffusion layer, wherein
the light diffusion film laminate comprises at least:
the anisotropic light diffusion layer which has a matrix region, and a pillar region composed of a plurality of pillar structures in the anisotropic light diffusion layer, and whose scattering central axis angle is −5° or more and +5° or less with respect to the normal direction of the layer, and whose linear transmittance varies depending on an incident angle of light; and
the isotropic light diffusion layer provided on one surface of the anisotropic light diffusion layer;
the reflective display device includes the anisotropic light diffusion layer, the isotropic light diffusion layer, and the image forming portion in this order from a light viewing side, and
a haze value of the anisotropic light diffusion layer is in a range of 80% to 98% and a haze value of the isotropic light diffusion layer is 50% or more and less than 80%.

10. The reflective display device according to claim 9, wherein when the incident angle of light is 10° or more and 40° or less with respect to the normal direction, a scattering angle region whose diffusion reflected light intensity is 95% or more of a peak value of the diffusion reflected light intensity of the light diffusion film laminate corresponds to at least −10° or more and +10° or less with respect to the normal direction.

11. The light diffusion film laminate for the reflective display device according to claim 9, wherein
the anisotropic light diffusion layer and the isotropic light diffusion layer are laminated, and
no other layer intervenes between the anisotropic light diffusion layer and the isotropic light diffusion layer such that the anisotropic light diffusion layer is in a direct contact with the isotropic light diffusion layer.

12. The light diffusion film laminate for the reflective display device according to claim 9, wherein
these haze values are calculated in accordance with JIS K7105.

* * * * *